though the medium of the transfer members, the general operator is effective to actuate the controlling members to actuate the master drivers and run the set-up number into the selected totalizers.

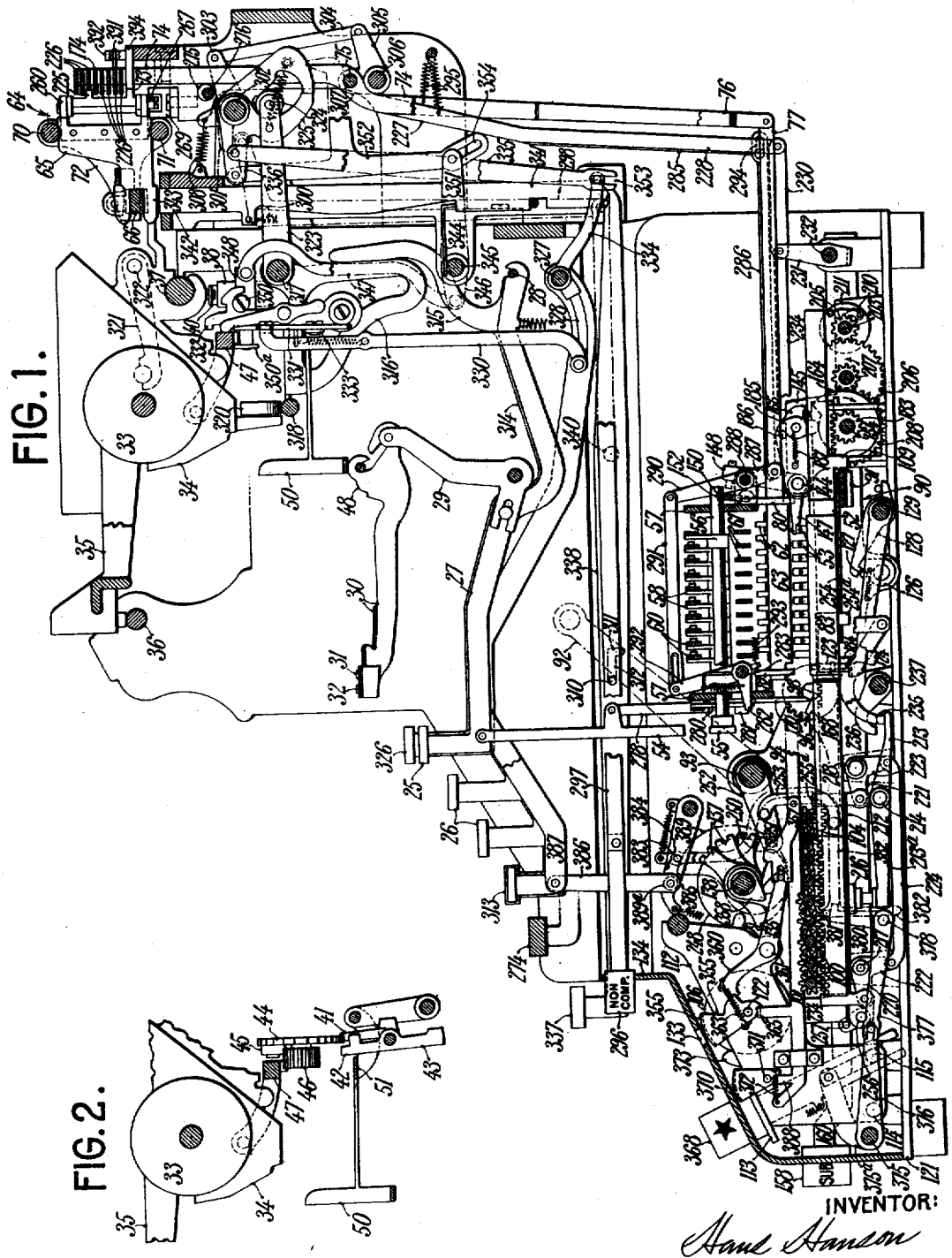

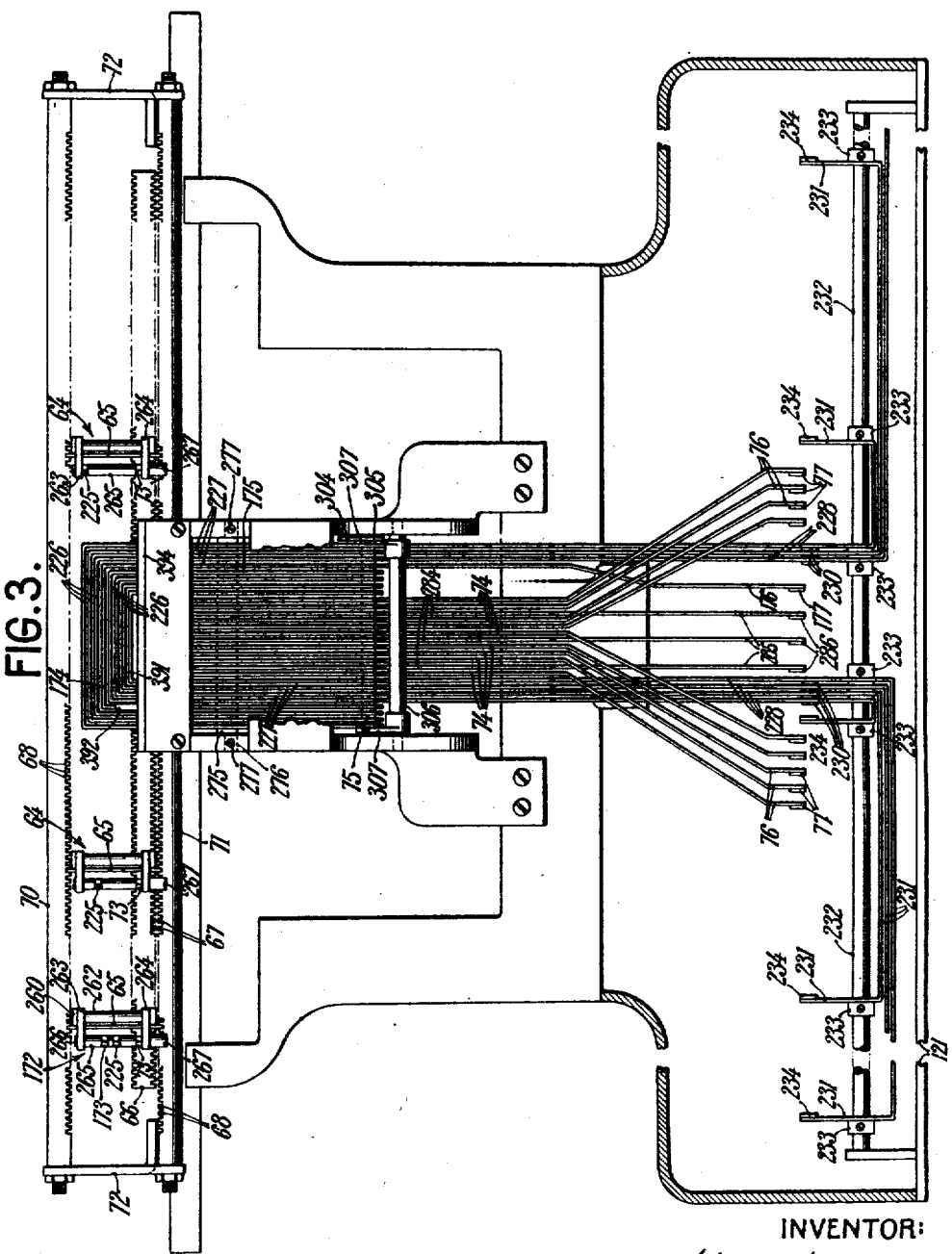

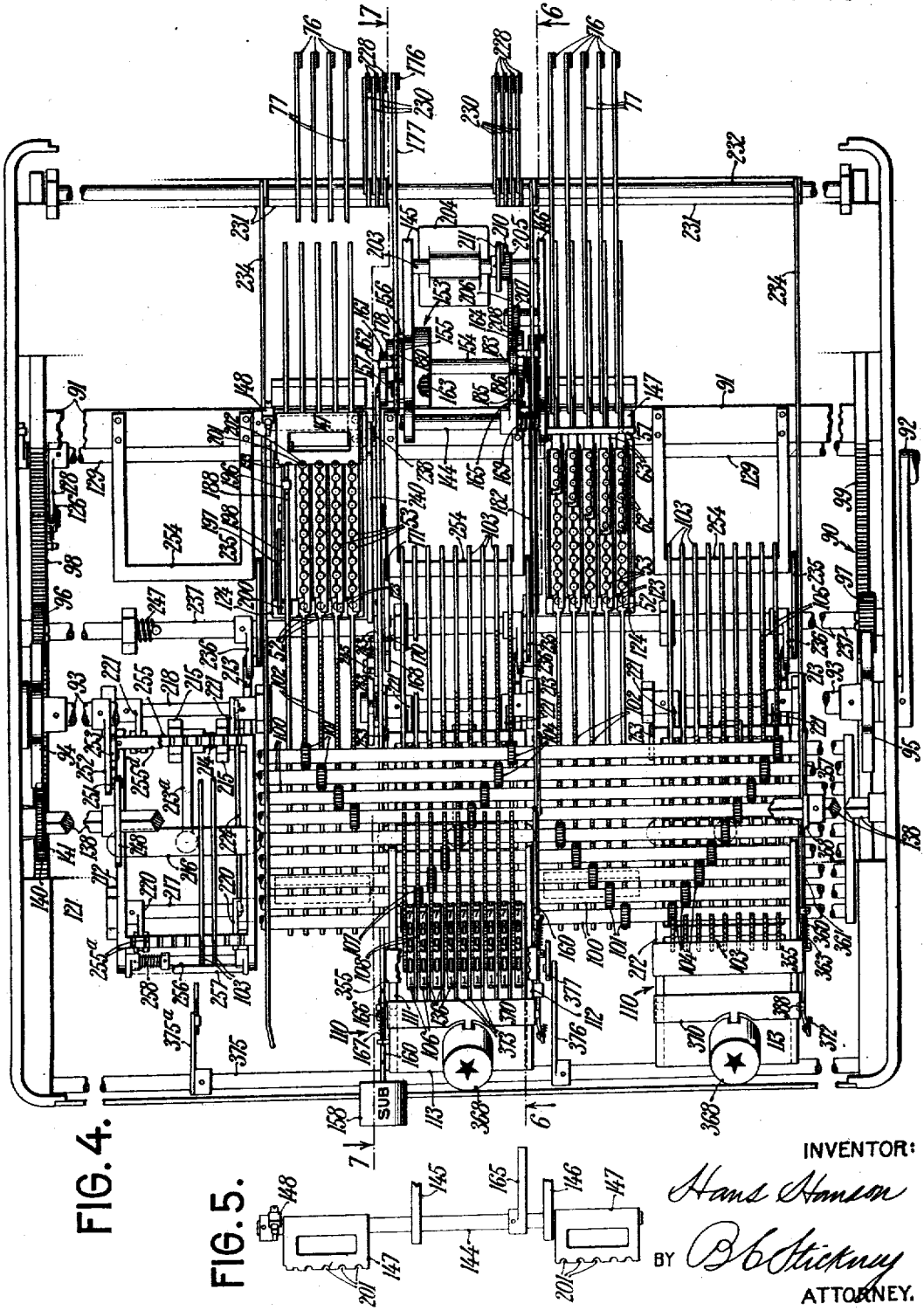

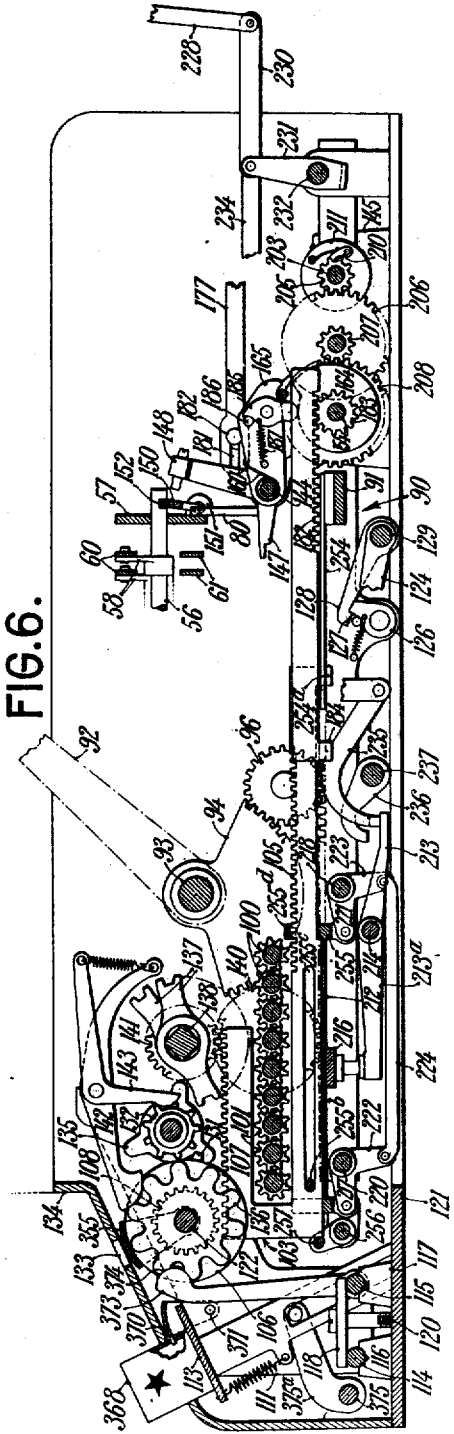
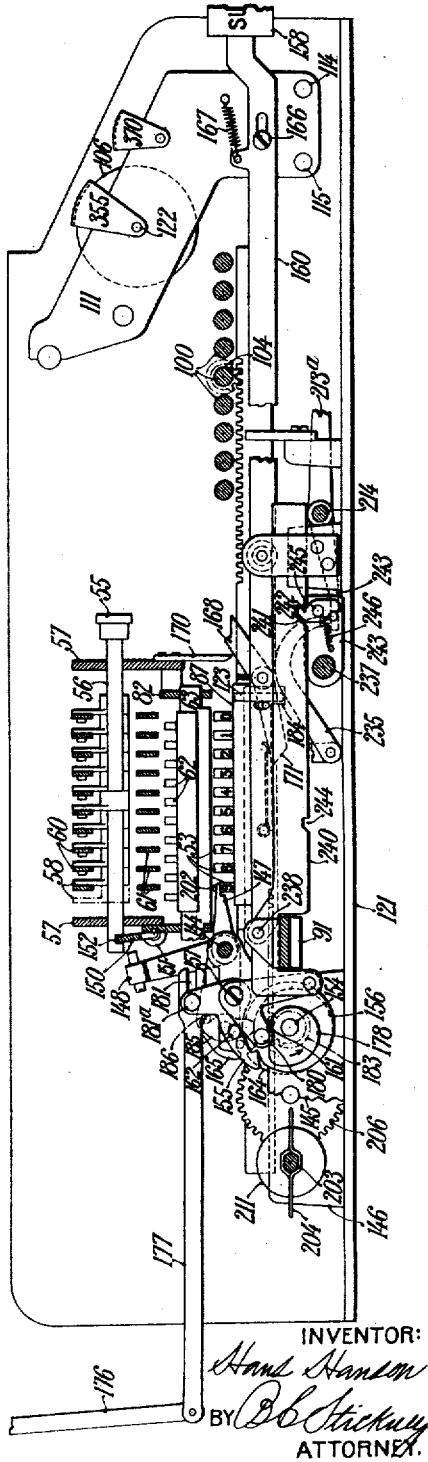

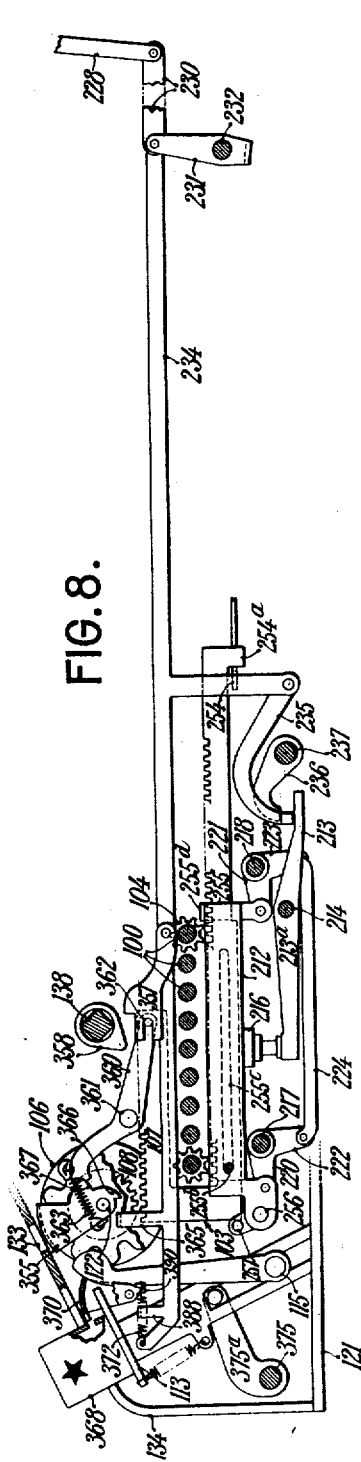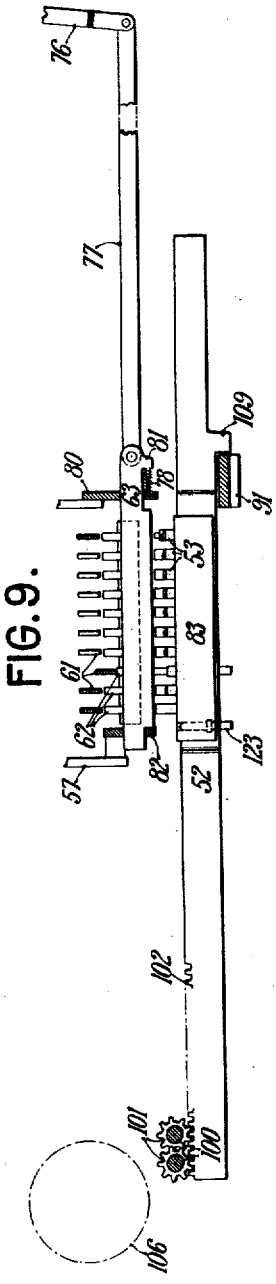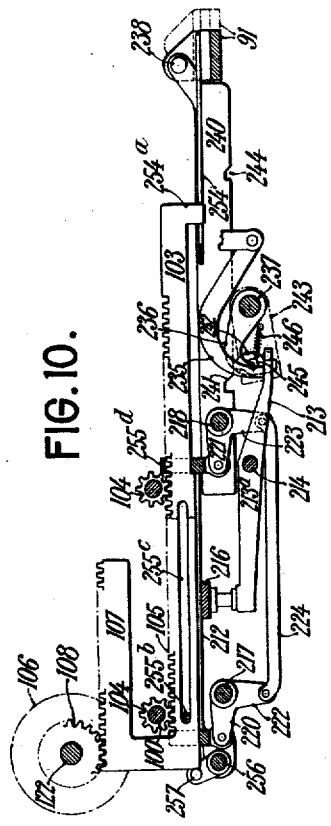

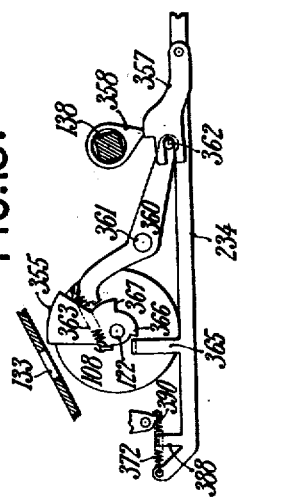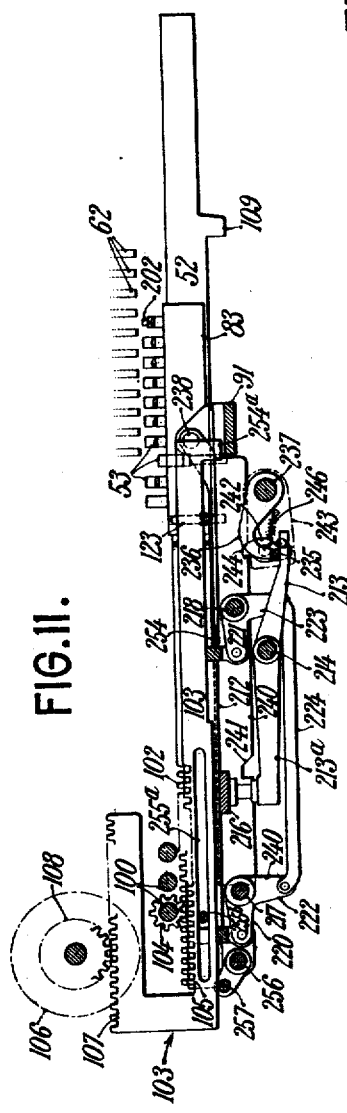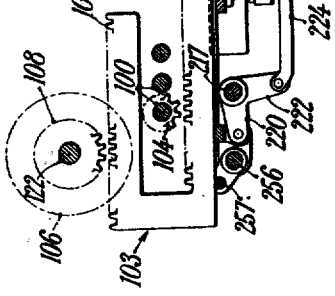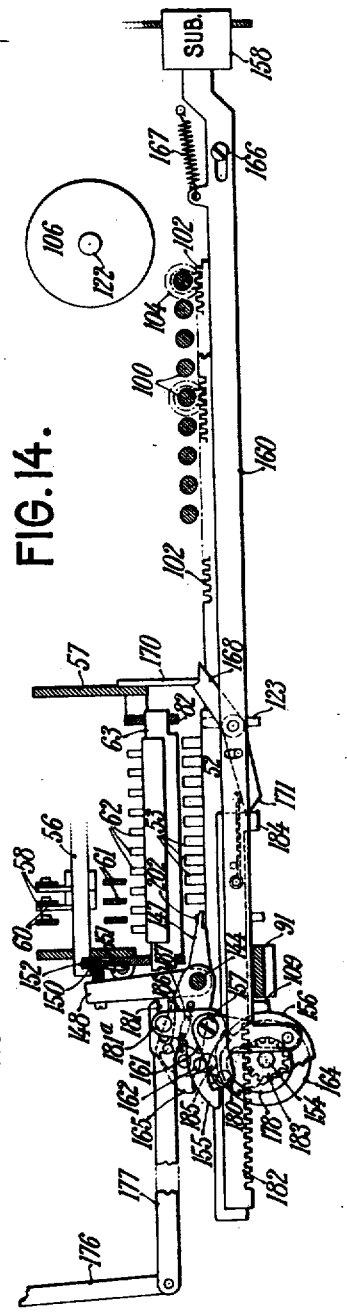

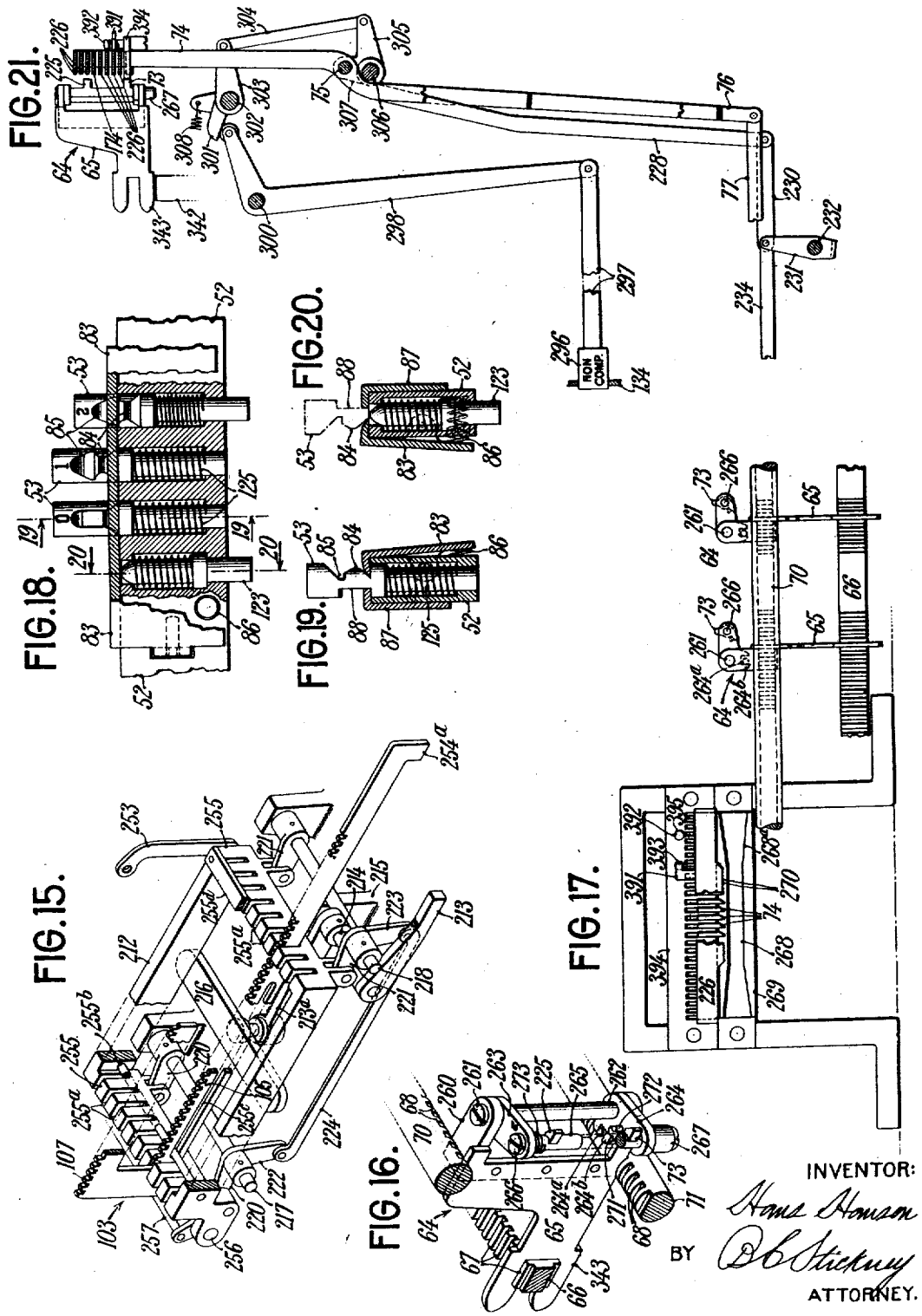

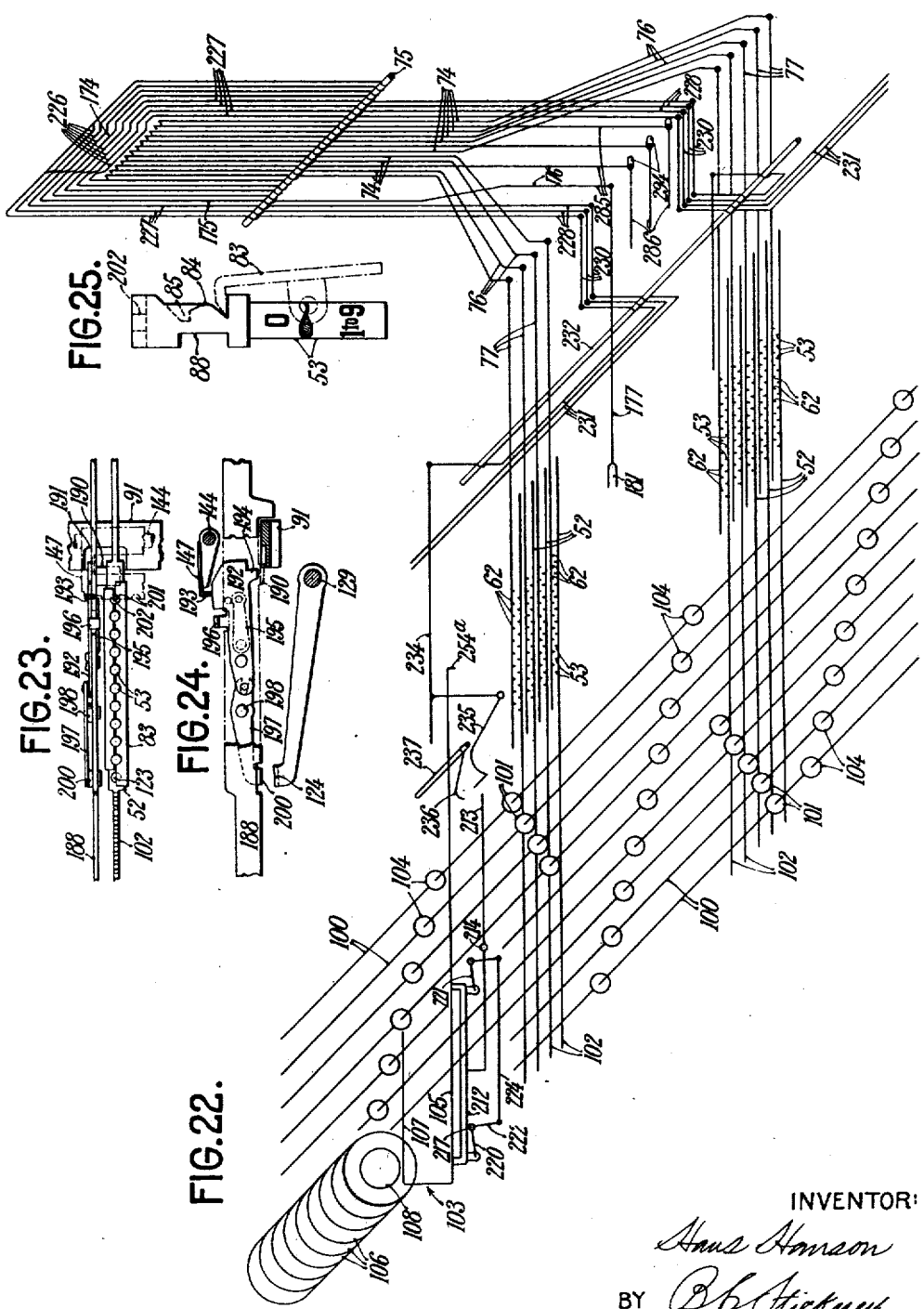

UNITED STATES PATENT OFFICE.

HANS HANSON, OF IVORYTON, CONNECTICUT, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,416,464.

Specification of Letters Patent.   Patented May 16, 1922.

Application filed August 13, 1919.   Serial No. 317,178.

*To all whom it may concern:*

Be it known that I, HANS HANSON, a citizen of the United States, residing in Ivoryton, in the county of Middlesex and State of Connecticut, have invented certain new and useful Improvements in Combined Typewriting and Computing Machines, of which the following is a specification.

This invention relates to combined typewriting and computing machines, and is herein shown as applied to the type known as the Underwood-Hanson machine. One form of this machine is shown in my Patent No. 1,278,812, dated September 10, 1918, which comprises a set of indexing members upon which a number that is typed by the numeral keys may be set up, while the letter-feeding carriage traverses a computing zone, after which a general operator may be actuated to run the set-up or indexed number into a totalizer or register. Indexing pins are settable by linkages actuable by the type keys, so that the general operator may drive the dials through various distances by engaging with the indexed pins to actuate a set of individual drivers.

It has been proposed to provide a set of master drivers with which a plurality of totalizers may be connected at will.

A feature of this invention is to provide a single set of controlling members, which may be set either additively or subtractively to actuate the master drivers.

Another feature of the invention is to provide means on the carriage to selectively and automatically connect one or more totalizers with the master drivers. In carrying out this feature of the invention, I have provided a series of selector levers in the form of bail-like members, actuable by selectors on the carriage. There is one selector lever for each totalizer, each having connected thereto a selector bar which, when actuated, sets an interponent to set up a preliminary condition in the machine to render the totalizer effective. Each totalizer has associated therewith a set of intermediate transfer members or interponents guided on a shiftable support, the several supports being actuable by the general operator through the medium of the various interponents, to effect the desired connections between the master drivers and dial wheels of the various totalizers. After the various totalizers have been connected through the medium of the transfer members, the general operator is effective to actuate the controlling members to actuate the master drivers and run the set-up number into the selected totalizers.

A further feature of the invention is the provision of a set of master-intermediate pin bars interposed between the indexing pins on the controlling members and the pin-setting linkages. These master pin-bars may be moved forwardly individually by adjustable devices on the carriage, as the latter passes through the computing zone, so that the indexing pins on the dial-driving members may be set by the linkages through the medium of the master pins. To move the intermediate or master pin bars to their pin setting positions, the selectors on the carriage may actuate denomination selecting levers connected with the master pin bars.

Provision is made to set the machine to subtraction by a motor which may be automatically released by the carriage. For this purpose, there may be provided a bail-like member or subtraction setting lever actuable by a selector, when the carriage passes into a subtraction zone, to release the motor, whereupon the latter rotates to set the "9" pins on the controlling elements, and change the connection between the pin setting linkages and the numeral keys, so that the indexing pins having complemental values of the numeral keys may be set by the latter. The motor comprises a spring which may be rewound by the general operator.

Means is provided to control the speed of the motor for the subtraction setting mechanism to cause the "9" pins to be set with a restrained action. This means, in the form herein shown, comprises a paddle or blade which is rotatively mounted and geared to the motor.

The selectors are provided with various tappets which may engage the totalizer selector levers, the denominational selector levers, and the subtraction setting lever. These tappets are provided on a pivoted member of the selector, which has thereon a roller to engage with a guide to accurately position and hold the tappets in their effective positions while the carriage is traversing a computing zone.

Provision is also made to retain one of the totalizers indefinitely in effective relation with the master drivers, to serve as a cross-totalizer, or, in other words, to compute crosswise of vertical columns.

Provision is further made to render the totalizer selector levers, the subtraction setting lever and the denomination selecting levers ineffective. For this purpose, a fulcrum, upon which all of said levers are pivotally mounted, is floatingly supported so that it may be actuated to swing said levers to take them out of effective relation with the respective tappets on the selectors. This may be done by a non-compute key, tabulator keys, a case-shift key and a back-spacer key.

The controlling members, by which the indexing pins are carried, are arranged in reverse denominational order, with the one of highest denominational order toward the right of the set, transposed connections being had between the controlling members and the dial wheels of the totalizers so that the controlling member to the extreme right-hand side of the set may actuate the dial wheel to the extreme left-hand side of the set of dial wheels in the totalizer. For this purpose, said drivers are provided with a set of pinions with which racks on the controlling members mesh; the set of pinions being arranged diagonally crosswise of said drivers. The drivers may also be provided with another one or more sets of pinions which may engage with racks on the intermediate transfer devices or connectors; the last-mentioned sets of pinions being arranged diagonally crosswise of said drivers and crosswise of the direction of the first-mentioned set of pinions.

Each controlling member is provided with a latch to hold the indexing pins in their set positions. Each latch is pivotally mounted to swing sidewise of the controlling member, and may be actuated by a release pin on the controlling member, all of the release pins being actuable by a universal bar during the latter part of the return stroke of the general operator, to release all the set indexing pins, thus clearing the machine of the set-up number after it has been run into the totalizer. The latch is also actuable by any one of the indexing pins, so that an erroneously set pin may be released by depressing the correct pin.

Individual shutters are provided for the totalizers, all of the shutters being normally effective to cover the dial wheels. The various shutters may be controlled and held in their normal positions by the totalizer selector bars. When a totalizer is selected, the associated totalizer selector bar moves out of holding relation with the associated shutter, the latter being released by means actuated during the return stroke of the general operator, so as to uncover the dial wheels to expose the numerals through a suitable sight-opening. When the carriage passes out of the computing zone, the totalizer selector bar returns to its normal position, thus restoring the shutter to cover the dial wheels.

Each totalizer is provided with a key to type a clearance sign, the various keys being actuable only under the conditions that the totalizer has been selected and that the dial wheels of the totalizer are in their "0" position. For this purpose each key is provided with a locking member, which is held in effective locking relation with the key by the associated totalizer selector bar, and the dial wheels have associated therewith intermediate controlling devices or elements, which may engage in depressions on the dial wheels to permit the locking member to be actuated only when all of the dial wheels of the totalizer are at zero. When the totalizer is selected for computation, the selector bar is actuated and tends to move the locking member. If, however, the dial wheels are not in their zero positions, the intermediate controlling devices prevent the locking member from being actuated, and, consequently, the key cannot be depressed.

Other features and advantages will hereinafter appear.

In the accompanying drawings,

Figure 1 is a staggered sectional side view of the machine, showing the parts in their normal positions.

Figure 2 is a detail view of the escapement devices and their connection with the typewriter carriage.

Figure 3 is a rear view of the machine with some of the parts omitted.

Figure 4 is a top plan view of the lower part of the machine, showing the master drivers, the controlling members therefor and transfer members for a plurality of totalizers.

Figure 5 is a detail view of part of the subtraction setting mechanism.

Figure 6 is a sectional side view of the lower part of the machine, the section being taken substantially on the line 6—6, Figure 4, and the parts being shown in their normal positions.

Figure 7 is a sectional side view of the lower part of the machine as seen from the other side, the section being taken substantially on the line 7—7 of Figure 7, and the parts being in their normal positions.

Figure 8 is a skeleton, diagrammatic, sectional view of the lower part of the machine, looking from the same side as in Figure 1, and shows a totalizer selected for computation.

Figure 9 is a skeleton, diagrammatic, sectional view, showing one of the intermediate pin bars in its actuated position and an indexing pin being set.

Figure 10 is a detail, diagrammatic view of parts shown in Figure 8, and shows the support for the intermediate transfer members actuated during the early part of the movement of the general operator, to connect the master drivers with the computing wheels of the totalizers through the medium of the intermediate transfer members.

Figure 11 is a view similar to Figure 10, but shows the parts in position after the general operator reaches its extreme forward position.

Figure 12 is a view similar to Figure 11, and shows the intermediate transfer members lowered out of effective relation with the master drivers and the computing wheels during the early part of the return movement of the general operator.

Figure 13 is a detail, diagrammatic view, showing a shutter released by a cam on the carry-over shaft.

Figure 14 is a diagrammatic, sectional side view as seen from the left-hand side of the machine, and shows the mechanism set to subtraction.

Figure 15 is a detail, perspective view of one of the supports for the intermediate transfer members and the mechanism for actuating and guiding said support.

Figure 16 is a perspective view of one of the selectors.

Figure 17 is a fragmentary top plan view, showing two selectors and the levers actuable thereby.

Figure 18 is an enlarged detail view of a portion of a controlling member and the spring-pressed indexing pins thereon.

Figure 19 is a sectional view of one of the controlling members, the section being taken on the line 19—19 of Figure 18.

Figure 20 is a sectional view of the controlling member, showing the release pin which is effective to actuate the latch to release the set indexing pin when clearing the machine of a number, the section being taken on the line 20—20 of Figure 18.

Figure 21 is a diagrammatic, side view, showing a non-compute key actuated to render the totalizer selector levers, the denomination selector levers and the subtraction setting lever ineffective.

Figure 22 is a diagrammatic, skeleton, perspective view, showing the invention in a general way.

Figure 23 is a detail top plan view of the supernumerary member and the adjacent units controlling member.

Figure 24 is a detail side view of the supernumerary member.

Figure 25 is an enlarged view, showing the shape of the "0" pin compared with the shapes of the other indexing pins.

Numeral keys 25 and alphabet keys 26, when depressed, actuate key-levers 27 about their fulcrum 28, to rock bell-cranks 29 to swing type bars 30 upwardly and rearwardly, to cause lower case types 31 and upper case types 32 to print against a platen 33, rotatively supported in a platen frame 34 on a typewriter carriage 35, adapted to travel back and forth on a front rail 36 and a rear rail 37.

The carriage 35 is urged from right to left of the machine by a spring drum 38, connected to the carriage by a strap 40, to effect letter-feeding movements of said carriage during typing operations. These letter-feeding movements of the carriage are controlled by escapement mechanism including a loose dog 41 and a fixed dog 42, (Figure 2), on a dog rocker 43. The dog rocker is reciprocated at each key depression to cause the dogs 41 and 42 to engage with an escapement wheel 44, having the usual one-way pawl connection 45 with a pinion 46 with which a pivoted feed rack 47 on the typewriter carriage meshes. To actuate the dog rocker, each type bar 30 is provided with a heel 48 to engage a curved universal bar 50 to move the latter rearwardly and swing the dog rocker 43 about its pivot by means of a cross-bar 51 on said universal bar. The usual springs, (not shown), may restore the universal bar and the dog rocker to their normal positions.

The carriage is adapted to traverse a computing zone. If a number is typed while the carriage traverses said zone, the number may be set up or indexed on a set of controlling members 52 by setting indexing pins 53 (having values from "0" to "9") thereon; the controlling members 52 being actuable after the indexing pins have been set to transfer their values to a totalizer, hereinafter described. To set the indexing pins on the controlling members, the numeral keys 25 are provided with pendants 54, which engage with arms 55 on shafts 56 to rock the latter. The shafts 56 are supported in a frame 57, and are provided with arms 58 to actuate pin-setting devices or linkages comprising horizontally-moving bars 60 connected with pin-setting bars 61 to move the latter vertically downward. When the carriage is out of a computing zone, the pin-setting bars 61 move idly down between intermediate pins 62, having values from "0" to "9" and carried by intermediate pin bars 63. While the carriage traverses the computing zone, the intermediate pin bars 63 are moved individually forward to bring the pins 62 into effective relation with the pin-setting bars 61 and the indexing pins 53, in a manner hereinafter described. Every time the carriage comes to a letter-space position in the computing zone, one of the pin bars 63 is held in its forward position, so that, if a numeral key is actuated, the associated pin-setting bar 61 depresses the pin 62 thereunder to set the desired indexing pin 53 on the controlling member 52.

To move the intermediate pin bars 63 to their effective pin-setting positions, there are provided on the carriage one or more selectors 64. Each selector comprises a body portion 65, which straddles a bar 66 and is held in place between the teeth 67 thereon and between the teeth 68 of two cross-bars 70 and 71, respectively, said bars being held at their ends in brackets 72 secured to the carriage 35. The selector is provided with tappets 73, which engage with denomination selector levers 74, to swing them individually about a fulcrum rod 75, to move the lower ends 76 of the denomination selector levers forwardly and push links 77, which may be connected with the intermediate pin bars 63 in any suitable manner, to move the latter to their pin-setting positions against return springs 78. (Figure 9), interposed between a guide plate 80 for the intermediate pin bars and projections 81 on said bars. The forward ends of the intermediate pin bars 63 are guided by a plate 82, both guide plates 80 and 82 being secured to the frame 57 of the rock shafts 56.

The indexing pins 53 may be held in their set positions on the controlling members 52 by pivoted latches 83, to be actuated by cams 84 and to engage in notches 85 of said pins. The latches are held in engagement with said pins by springs 86, (Figures 18, 19 and 20). A plate 87 may be provided to engage with flat faces 88 on the indexing pins 53, to prevent the pins from turning on the controlling members 52.

After the indexing pins 53, corresponding to the number typed, have been set, the controlling members 52 may be actuated by a general operator 90 including a cross-bar 91, which may be moved forwardly in any convenient manner, a handle 92 being herein shown for this purpose, which rocks a shaft 93, having two segmental gears 94 and 95 thereon which mesh with two pinions 96 and 97 to drive racks 98 and 99, forming part of the general operator 90 and to which the cross-bar 91 is secured. The cross-bar 91 engages with the set pins 53 to move the controlling members 52 through distances equal to the values of the set pins.

The controlling members 52 actuate a set of drivers or driving elements 100 (Figures 1, 4 and 11), which have pinions 101 thereon, meshing with racks 102 on the controlling members. The drivers actuate a set of interponents or transfer elements or devices 103 by means of pinions 104 on said drivers, meshing with racks 105 on said transfer devices to drive computing wheels 106, having numerals from "0" to "9", inclusive, thereon, through distances proportional to the movements of the corresponding controlling members, by means of racks 107 on said transfer devices, meshing with pinions 108 secured to the computing wheels. The controlling members 52 are restored to their normal position by the cross-bar 91 during the return stroke of the general operator, when said cross-bar engages with projections 109 on the controlling members.

The computing wheels 106 form part of a totalizer 110, having end plates 111 and 112, joined by a cross-piece 113 and two rods 114 and 115 (Figures 4 and 6). The rods 114 and 115 rest on positioning blocks 116 and 117, and are secured thereto by a plate 118 and a screw 120 threaded into a base plate 121, to hold the totalizer in place. The computing wheels 106 are rotatively supported on a rod 122, supported between the side plates 111 and 112.

The indexing pins 53 are released to resume their ineffective positions prior to setting up a new number. For this purpose, each controlling member 52 is provided with a release pin 123 (Figures 1, 18 and 20), all of the release pins being actuated during the latter part of the return stroke of the general operator 90 by a universal bar or bail 124, to swing the latches 83 out of holding relation with the set indexing pins 53, thus permitting springs 125 to return said pins to their normal or ineffective positions.

To actuate universal bar 124 for the release pins 123, there is pivotally mounted on the general operator 90 a pawl 126, which is ineffective during the forward stroke of the general operator, but engages, during the latter part of the return stroke of the general operator, with a cam 127 on an arm 128, secured to a shaft 129, to rock the latter to swing the universal bar 124, extending forwardly from said shaft and underlying the release pins 123, so that they may be actuated together. It should be understood that the pawl 126 is carried past the cam 127 to release the arm 128, the pawl then projecting into a notch in said arm.

An error may be corrected by properly repositioning the carriage in the computing zone and then typing the correct number. If, for example, the figure 2 is typed where 3 should have been typed, the "2" indexing pin is set instead of the "3" pin. By bringing the carriage back to the proper position and typing the 3, the "3" indexing pin is set. The cam 84 on the "3" pin moves the latch 83 to release the "2" pin, thus permitting the latter to return to its normal position. The zero numeral key is also provided with a pin setting linkage adapted to actuate the "0" pin. The "0" pins are provided for making corrections, each being effective to actuate the latch to release any one of the indexing pins 53 from "1" to "9," inclusive, but they are not provided with notches 85 as the other indexing pins are; consequently, they are not held in their actuated positions, there being no need to latch the "0" pin down, because when "0" is typed in any denominational position, the controlling member of that denominational position is left unactuated when the general operator moves forward. The "0" pin, therefore, is provided simply with a cam 84 to actuate the latch 83.

To effect the carrying from one computing wheel or dial wheel 106 to another, each dial wheel is provided with a tooth 131 to rotate a pinion 132 as the dial wheel passes from "9" to "0" at a sight-opening 133 in a cover plate 134. The pinion 132 has a three-toothed member or pinion 135 connected therewith to bring the latter into mesh with a gear wheel 136, secured to the next adjacent dial wheel 106. The pinion 132 when rotated is rendered effective to be actuated by an arm 137 on a carry-over shaft 138, there being one arm 137 for each pinion 132. The carry-over shaft 138 is actuated during the return stroke of the general operator 90, and is geared to the rack 98 of the general operator by an intermediate pinion 140, meshing with a pinion 141, the latter having a one-way ball clutch connection with the carry-over shaft 138, as in the Underwood-Hanson machine. When the carry-over shaft 138 is rotated, the various arms 137 thereon engage with the various pinions 132 which have been set to produce carry-overs, so that the three-toothed members 135 may be actuated to rotate the dial wheels 106 through single digit positions. The carry-over shaft 138 is caused to make a complete revolution, thus restoring the arms 137 to their normal positions. Detents 142 and 143 are provided to hold the dial wheels 106 and the carry-over pinions 132, respectively, against accidental displacement.

In the present invention, the complemental method of subtraction, with a base nine, is used as in my prior patent above referred to. In this method, it is necessary to set the "9" indexing pins 53 and change the connections between the key-operated shafts 56 and the bars 60 of the pin-setting linkages, so that the numeral keys may actuate the pin-setting linkages and set the indexing pins having the complementary values of said numeral keys.

Subtraction-setting mechanism is provided to set the "9" pins and change the connections of the pin-setting linkages. This subtraction-setting mechanism may comprise a rock shaft 144, carried by plates 145 and 146, and having two setting plates 147 thereon, engaging with the "9" pins on the set of controlling members 52, which set is divided into two groups for a purpose which will hereinafter appear. The plates 147 depress the "9" pins when the rock shaft is actuated. The rock shaft 144 is also provided with an arm 148 to engage with a pivoted universal bar 150, pivoted on ears 151 and engaging in notches 152 in the various rock shafts 56, to move said rock shafts forwardly to change the connections with the pin-setting linkages.

The rock shaft 144 may be actuated by a motor 153, herein shown as a spring motor, comprising a shaft 154 which is normally held by a pawl 155, engaging with a disk 156 on said shaft, (Figure 7), the pawl 155 being pivoted at 157 and actuable to release the motor 153 either manually or automatically.

To release the motor 153 manually, there is provided a subtraction key 158, at the front of the machine, (Figures 1, 4 7 and 14), on the end of a bar 160 to move the latter rearwardly, to swing a bell-crank 161 about the pivot 157, said bell-crank engaging with a pin 162 on the pawl 155, to swing the latter out of holding relation with the disk 156, (Figure 14). The shaft 154 immediately starts rotating under the influence of a spring 163 of the motor 153, to cause a cam 164 secured to said shaft to make a complete turn and rock the subtraction setting shaft 144, through the medium of an arm 165 on which is a pivoted pawl 185 which is engaged by said cam. Consequently the "9" pins are set, the connections of the key-operated rock shafts 56 and the pin-setting linkages changed and the subtraction-setting shaft 144 returned to its normal position by means described hereinafter. The subtraction key 158 may be supported at its forward end by a shouldered screw 166 on the plate 111 of the totalizer, and may be moved against the tension of a return spring 167 connected thereto. A spring-pressed latch 168 may be pivoted on the rod 160 to retain it in its actuated position, the latch engaging with a projection 170 secured to the frame 57 of the pin-setting linkages. After the indexing pins 53 have been set, the general operator, including the cross-bar 91, is actuated to move the controlling members forwardly, as hereinbefore described. During the latter part of the forward movement of the general operator 90, the cross-bar 91 engages with a cam 171 on the latch 168, to swing the latter out of engagement with the projection 170, thus releasing the subtraction bar 160 to permit it to be restored to its normal position by the spring 167, and, consequently, bringing the holding pawl 155 into engagement with the disk 156 on the motor shaft 154. A spring 169 (Figure 4) is provided to restore the pin-setting rock shaft 144 to its normal position, one end of said spring being connected to the plate 146, the other end bearing against the arm 165 on said shaft.

To release the motor 153 automatically, so that the machine may be set to subtraction without the attention of the operative, there may be provided a subtraction selector 172, (Figure 3), set opposite the column in which it is desired to subtract. This selector 172 is provided with a subtraction tappet 173, which, as the carriage enters the computing zone, engages with a cam 174 on a bail-like lever or subtraction-setting lever 175, to rock the latter about the fulcrum rod 75, to swing the lower end 176 of said bail forwardly to actuate the pawl 155 by means of a link 177 connected thereto, thus swinging the pawl 155 out of holding relation with the disk 156, to release the motor 153 and actuate the subtraction-setting mechanism, as hereinbefore described. As the motor shaft rotates, a cam 178 thereon engages with a pin 180 on the bell-crank 161, to actuate the subtraction bar 160 until the latch 168 engages in back of the projection 170, thus automatically locking the holding pawl 155, through the medium of the pin 162 engaging with the bell-crank, out of effective relation with the disk 156. It will be seen that the subtraction key 158 is drawn into the machine when it is automatically set to subtraction. Thus the key serves to indicate the state of the machine, irrespective of whether it has been set manually or automatically. The forward end of the link 177 has a slot 181 therein to permit a pin 181ª, with which said link engages, to move idly forward when the pawl is actuated by the subtraction key 158, thus leaving the connections, including the subtraction-setting lever 175 and the link 177, undisturbed while the machine is being set to subtraction manually.

The motor 153 may be re-energized by rewinding the spring 163 by a rack bar 182, meshing with a pinion 183 (Figures 6 and 14) on the motor shaft 154, the rack bar 182 being moved forwardly by the cross-bar 91 during the actuation of the general operator, said cross-bar engaging with a projection 184 on said rack bar. It will be understood that every time the motor is released, the rack bar 182 moves rearwardly a distance corresponding to one revolution of the shaft 154 to be in readiness to rewind the motor when the general operator is actuated. The degree of unwinding of the motor may be limited in any suitable manner so as to prevent more than one complete turn of the cam 164.

A pivoted pawl 185 on the arm 165, secured to the subtraction-setting rock shaft 144, is held against a pin 186, (Figure 6), on said arm by a spring 187 so that the motor may be rewound without actuating the subtraction-setting rock shaft 144, the cam 164 swinging the pawl 185 idly against the tension of the spring 187.

To run in an extra digit into the units place of the totalizer, to correct the mathematical error in the complemental method of subtraction, there is provided a supernumerary bar 188, (Figures 4, 23 and 24), adjacent to the controlling member 52 of units position. The supernumerary bar 188 is provided with a lip 190, which extends laterally therefrom into the plane of the indexing pins 53 on the units controlling member. When the machine is set to addition, the lip 190 enters a notch 191 in the cross-bar 91 of the general operator, during the forward movement of the latter, until the forward edge of the lip is in alignment with the forward edge of said cross-bar. The supernumerary bar then moves idly forward with the general operator. When the subtraction-setting mechanism is actuated, a latch 192 on the supernumerary bar 188 is actuated by a finger 193 on the "9" pin-setting plate 147, to bring a projection 194 of the latch into the path of the cross-bar 91, so that the supernumerary bar may be moved immediately when the general operator is actuated, the forward edge of the lip 190 being one digit distance in advance of the cross-bar 91, thus causing the set indexing pin 53 on the units controlling member to be engaged by the lip 190, instead of the cross-bar 91, and consequently, move the units controlling member 52 one digit distance further than the distance corresponding in value to the value of the set indexing pin, consequently correcting the mathematical error. The latch 192 may be held in either of its positions by a detent spring 195, and may be limited in its downward movement by a stop 196, engaging on the upper side of the supernumerary bar 188. To render the latch 192 ineffective, there is provided an intermediate lever 197, pivoted at 198 on the supernumerary bar 188. The lever 197 has a free end 200, which is moved into engaging relation with the universal bar 124 when the latch 192 is set, so that it may be actuated by said universal bar during the latter part of the return stroke of the general operator, to withdraw the projection 194 from engaging relation with the cross-bar 91 of the general operator.

As above described, the "9" pins are all set and the connections to the pin-setting devices are changed during the subtraction-setting operation, which takes place when the carriage enters the subtraction zone. When the number is being typed, as the carriage passes through the zone, the indexing pins 53, having complemental values of the numerals typed, are set on the controlling members, and consequently if the numerals are other than zero, the "9" pins on the various controlling members must be released. For this purpose, each indexing pin 53 is effective by means of the cam 84 thereon to release the "9" pin. The "0" pin-setting linkage is disconnected, to be ineffective, and the "0" numeral key is connected with the "9" pin-setting linkage when the machine is set to subtraction. This is done that the "9" pin may be set again if it has been erroneously released. For example, if the operative erroneously types "1" instead of "0," the "8" pin, which is set by the "1" pin-setting linkage while the machine is set to subtraction, releases the set "9" pin. To make the correction, the operative brings the carriage back to the proper denominational position, and actuates the "0" numeral key, and consequently the "9" pin-setting linkage to set the "9" pin and release the erroneously set "8" pin. The "9" pin-setting plates 147 (Figure 4) are provided with cutouts 201 into which reduced heads 202 of the "9" pins project, to permit the "9" pins to be set by the "9" pin-setting linkage without interfering therewith.

It is desirable to restrain the motor 153 during its operation to set the "9" pins. For this purpose, there is geared to the motor shaft 154 a speed governor (Figures 4, 6 and 7), which may comprise a shaft 203 with a blade 204 thereon, said shaft 203 having a pinion 205 thereon to be driven by a gear wheel 206, the latter having a pinion 207 secured thereto, to be driven by a gear wheel 208 on the motor shaft. A pawl 210 mounted on a disk 211, secured to the governor shaft 203, engages with the pinion 205 so as to effectively rotate the blade 204 only while the motor is giving off its energy.

Computation may be had in a plurality of totalizers, provision being made for seven totalizers, in the present instance. The number set up on the controlling members 52 may be run into all of the totalizers simultaneously, into any individually selected totalizer, or into any combination of selected totalizers, according to the setting of the selectors on the carriage.

To compute in the various totalizers 110, the drivers 100 may be in the form of shafts extending crosswise of the controlling members 52. The drivers or shafts 100 are provided with a plurality of sets of pinions 104, one set for each totalizer, with which the transfer elements 103 of the various totalizers may engage. The transfer elements 103 are normally out of driving relation with the drivers 100 and the dial wheels 106, and each set of transfer elements is carried by a movable support 212 (Figures 4, 11 and 15), which may be moved upwardly, in a manner presently to be described, by an arm 213 which, when depressed, rocks a short shaft 214 on brackets 215. The shaft 214 has a forwardly-projecting arm 213*, located centrally relatively to the movable support or carrying frame 212, and engages with a cross-bar 216 on said support 212, to raise the latter, to bring the racks 105 and 107 of the transfer elements 103 into mesh with the pinions 104 on the drivers and the pinions 108 on the dial wheels 106. Each support is guided to move parallel to itself by means of rock shafts 217 and 218, having arms 220 and 221 by which the support is carried, and arms 222 and 223 connected by a link 224.

The totalizers 110 may be rendered effective by tappets 225 on the selectors to engage with cams 226 on bail-like totalizer selector levers 227, to swing said levers about the fulcrum 75, and cause the lower ends 228 thereof to move links 230 forwardly to rock bails 231 pivoted on a rod 232. The various bails 231 are held in place on the rod by collars 233 (Figure 3), and extend laterally to their respective totalizers, where they are connected with the various totalizer selector bars 234. Each selector bar 234 is connected with an interponent 235, which may be pivoted thereon and may be moved to its effective position, (Figure 8), between a finger 236 on a rock shaft 237 and the arm 213. It should be understood that each support 212 is provided with an arm 213, and that there is a plurality of fingers 236 on the rock shaft 237, one associated with each arm 213; and, further, that the totalizer selector bars 234 are effective only to introduce the interponents between the fingers 236 and the arms 213.

The totalizers 110 are connected after the number is set up on the controlling members 52, and during the early part of the forward movement of the general operator 90. For this purpose, there is connected at 238, (Figures 4, 7 and 10), to the cross-bar 91 of the general operator 90, a bar 240 having a cam 241 thereon, to engage with a pivoted pawl 242 on an arm 243 secured to the rock shaft 237 to swing the arm 243 downwardly and actuate the rock shaft 237, the fingers 236 thereon engaging with the effective interponents 235 to actuate the arms 213 to connect the selected totalizers through the medium of the transfer devices 103, as previously described.

As the general operator reaches the end of its forward movement, the pawl 242 drops into a notch 244 (Figure 11) in the bar 240, thus permitting the support 212 to drop slightly, but not sufficiently to take the racks 107 of the transfer elements 103 out of mesh with the pinions 108 on the computing wheels 106, thus preventing overthrow of said computing wheels. This is done so that the general operator, as it starts on its return movement, may render the pawl 242 ineffective by swinging it about its pivot 245 and against the tension of a spring 246 (Figure 12), thereby permitting the arm 243 to rise, and the rock shaft 237 to be restored to its normal position by a return spring 247. (Figure 4). Consequently, the supports 212 are lowered to take the racks 105 and 107 of the transfer elements 103 out of mesh with the pinions 104 of the drivers and the pinions 108 of the computing wheels, prior to the restoration of said transfer elements 103 to their normal position relatively to the supports 212.

Gravity will ordinarily restore the supports 212 for the transfer devices 103. If the reversing of the general operator is very rapid, however, the transfer devices 103 may not become disconnected quickly enough. Means is therefore provided to insure the restoration of the various supports during the early part of the return stroke of the general operator and before the transfer elements are moved towards their normal positions. For this purpose, the carry-over shaft 138 is provided with a series of disks 248 (Figures 1 and 4), one for each totalizer, each disk having a notch 250 therein, into which a pin 251 projects from an arm 252 pivotally mounted on the rock shaft 93, the arm 252 being connected to the support 212 by a link 253 to raise the pin 251 into the notch 250 when the support 212 is raised. When the carry-over shaft starts rotating, the disks 248 engage with the various pins 251 to swing the arms 252 downwardly, and consequently lower the corresponding supports 212. It will be evident that, during the rotation of the carry-over shaft, the disks will serve to lock the arms 252 and the supports 212 in depressed position. Furthermore, the carry-over shaft will be locked against movement during the forward movement of the general operator when the carriage is positioned to select any of said totalizers.

To restore the transfer elements 103 to their normal positions relatively to their supports 212, each set has associated therewith a U-shaped universal bar 254 (Figures 1, 4 and 12), extending forwardly from the cross-bar 91 of the general operator, to engage with projections 254ᵃ on the transfer elements to draw them rearwardly; the parts being so proportioned as to allow the general operator to move sufficiently to restore the supports 212 before the universal bars 254 engage with the projections 254ᵃ to restore the transfer devices 103.

The transfer elements may be guided in slots 255ᵃ, (Figure 15), in cross-bars 255 of the supports 212, and each set of elements is caused to move up and down with the support by a rod 255ᵇ extending from side to side of the support and through slots 255ᶜ on the transfer elements, and also by a strap 255ᵈ extending over the transfer elements. Each support 212 has pivotally mounted on a fixed rod 256, carried thereby, a universal bar 257 which becomes effective toward the end of the return movement of the transfer elements 103 to fully restore them on their support by a spring 258, (Figure 4), connected with said universal bar 257.

Each selector may comprise a yoke-like member 260, (Figure 16), secured to the body portion 65. The yoke-like member 260 has pivoted thereon, at 261, a frame comprising a short shaft 262, with two arms 263 and 264 projecting therefrom, to carry a tappet shaft 265 pivoted on said arms at 266. A roller 267 is provided on the arm 264 to engage in a groove 268 of a channel-shaped guide bar 269 (Figure 17), as the carriage traverses the computing zone, so as to accurately position and retain the tappets 73, 173, and 225, which project from the tappet shafts 265 of the various selectors, in effective relation with the various levers to be actuated by the tappets. Each tappet shaft 265 is provided with an arm 271, which is held against a pin 272 by a spring 273, coiled around the shaft, against which said shaft may yield as the tappets pass their co-operating levers during the return movement of the carriage.

A pin 264ᵃ on the yoke member 260 engages in a slotted extension 264ᵇ (Figures 16 and 17), of the arm 264 to prevent the frame, comprising the shaft 262 and arms 263 and 264, from swinging sufficiently to get the roller 267 out of alignment with the tapered ends 268ᵃ of the groove or guide slot 268.

It will be seen that, due to the mounting of the tappet shaft 265 in a frame pivoted on the selector 64 and the provision of the roller 267 and the slot, the tappets on said shaft will be accurately positioned, any slight displacement, due to failure to place a selector completely on the rack bar, or to other causes, being compensated for by the engagement of the roller 267 in the slot 268.

Under ordinary conditions, when the operative wishes to correct a numeral just typed, the carriage is moved back two or three letter-spaces and then advanced again to the proper position by the usual space-bar 274. When the carriage is moved backward, the tappet 173 is dragged over the cam or engaging portion 226 of the selector lever, and is rendered ineffective; consequently, the totalizer selector lever resumes its normal position. The edge of the engaging portion 226 is provided with fine teeth 270 (Figure 17), so that, as the carriage is fed to its proper position by the space-bar, the tappet catches on the teeth 270 and is returned to its effective position. As the tappet is again brought to its effective position, the totalizer selector lever is again moved to its effective position.

It should be understood that if the tappet 225 is constructed as indicated in Figure 16, it will engage with only one totalizer selector lever 227. There may be a plurality of tappets 225 on each tappet shaft 265, or a single tappet may be of a sufficient width to engage with all of the totalizer selector levers 227, or as many as desired, so that, as it enters the computing zone, the various selector levers may be operated, thereby rendering all of the totalizers effective by inserting the interponents 235 between the fingers 236 and the actuating arms 213. In the latter case, however, it may be necessary to provide a notch in the elongated tappet if it is not desired to actuate the subtraction-setting means. It will further be understood that various combinations of totalizers may be selected by having the tappets differently arranged on the tappet shafts or members 265.

The over-lap, as seen in Figure 1, between the various tappets on the selectors 64 and 172 and the various levers actuated thereby may be adjusted by an eccentric stop 275, which may be rotated about its axis 276 to procure the proper adjustment, and secured in place by one or more screws 277, (Figure 3).

It will be seen by an inspection of Figure 4 that the set of controlling members 52 is arranged in two groups, the groups occupying the spaces between the middle totalizer and the two adjacent totalizers. It will further be seen that the controlling members are arranged in a reverse denominational order; in other words, the controlling member of lowest denominational order is to the left of the set, while the one of highest denominational order is to the right of the set. This is done so that the intermediate pin bars 63, associated with the controlling members, may be connected in a simple manner with the denomination selecting levers 74, which are arranged in the same order, due to the fact that they are engaged in a descending order by the carriage as it travels from right to left.

The connections between the controlling members 52 and the dial wheels 106 of the totalizer may be transposed by arranging the set of pinions 101, connecting the controlling members 52 with the drivers 100, diagonally crosswise of said drivers, and the sets of pinions 104, connecting the drivers with the transfer elements 103, diagonally crosswise of the drivers 100 and in a direction crosswise of the direction of the set of pinions 101. By this arrangement, with the pinions 101 progressing from right to left towards the back of the machine, while the pinions 104 progress from left to right towards the back of the machine, the controlling members 52 of units position to the left of the set may drive the dial wheels 106 to units position to the right of the various sets of dial wheels.

From the foregoing, it will be understood that the master drivers with the pinions 101 and 104 thereon serve also as transposition devices between the controlling members 52 and the dial wheels of the various totalizers.

It is desirable, in writing the numerals in the various columns of figures, to punctuate between millions and hundreds of thousands, thousands and hundreds, and in the decimal position after units. This may be done by typing a punctuation mark in the various positions, or by actuating the space key to leave a blank space. Means is provided to lock the numeral keys when the carriage reaches these punctuation positions, to prevent the operative from typing numerals in said positions. For this purpose, each numeral key 25 has connected therewith a wedge or intruding member 278, which may engage between a set of pivoted pawls 280 suspended between two studs 281, one at each side of the set of pawls, with sufficient play in the set to permit the entrance of only one wedge at a time, as shown in my patent herein referred to. An intruding dog 282 may be yieldingly connected to a shaft 283, and adapted to enter between two of the suspended pawls 280 to take up the play in the set of pawls and prevent the entrance of the various wedges 278 of the numeral keys, thus locking the numeral keys against actuation. To actuate the intruding dog 282, there are provided pivoted levers 284, one for each punctuation position in the column, said levers being actuable by the tappets 73 on the selectors as the carriage traverses a computing zone. The levers 284 are swung about their fulcrum 75, to cause the lower ends 285 to move forwardly, to push links 286 connected to an arm 287 on a shaft 288 to rock the latter. The shaft 288 is provided with an upwardly-projecting arm 290 to pull a link 291 rearwardly when any one of the levers 284 is actuated, to actuate the shaft 283 by means of an arm 292 connected to said link, and swing the intruding dog 282 to its effective locking position. A spring 293 may be connected to the shaft 283 to restore it to its normal position. The links 286 are provided with slots 294 so that they may move idly forwardly when one of the levers is actuated without disturbing the other levers. The levers 284, as well as the levers 74, 175 and 227, may be moved against return springs 295 (Figure 1).

The computing mechanism may be rendered ineffective by a non-compute key 296, which, when actuated, moves a plunger 297 rearwardly to swing a bell-crank 298 about a pivot 300. The bell-crank 298 engages with an arm 301, secured to a shaft 302, to rock the latter in a clockwise direction. The shaft 302 is provided with another arm 303 to move downwardly a link 304, connected to an arm 305 on a shaft 306, to rock the latter. The shaft 306 is also provided with two upwardly-extending arms 307 to support the fulcrum rod 75, (Figures 1 and 3), upon which the denominational selecting levers 74, totalizer selecting levers 227, subtraction setting lever 175 and the key locking levers 284 are pivotally mounted. When the shaft 306 is actuated, the fulcrum rod 75 is carried rearwardly, thus swinging all of the levers about their points of connection with the links 77, 230, 177, and 286, respectively, to move their upper ends out of effective relation with the tappets on the selectors (Figure 21). The rock shaft 302 is moved against a return spring 308, and may be retained in its actuated position by a pin 310 on the plunger or bar 297, which may engage in a depression 311 of an elongated slot 312 in the machine frame. The shaft 302 may be released at will by the operative, by raising the pin 310 out of the depression 311 to permit the spring 308 to restore the non-compute key 296 and the various levers 74, 175, 227, and 284 to their effective positions.

The platen 33 may be shifted to upper case position so as to facilitate typing with the upper case types 32. For this purpose, there is provided a shift key 313, which, when depressed, swings shift key lever 314 about the fulcrum 28, to cause an arm 315 on said lever to swing a shift frame 316 about the axis of a shaft 317. The shift frame comprises a rail 318, which moves upwardly, and by engaging with a roller 320 on the platen frame 34 the rail 318 moves the platen frame upwardly to carry the platen 33 to its upper case position. The usual arms 321 on a rock shaft 322 may be used to guide the platen frame 34 in its case shifting movements.

It is desirable to render the computing mechanism ineffective when the platen is shifted to its upper case position. For this purpose, there is secured to the shaft 317 of the shift frame a rearwardly-extending arm 323, having a roller 324 thereon to engage with a cam arm 325 on the rock shaft 302, so that when the shift frame 316 is actuated, the rock shaft 302 is swung in a clockwise direction by said arm 323, to actuate the rock shaft 306, to swing the fulcrum rod 75 rearwardly and thus move the engaging portions of the levers pivoted on said rod 75 out of effective relation with the tappets on the selectors. It will be seen that when the rock shaft 302 is actuated by the arm 323, the non-compute key 296 is left undisturbed, as the arm 301 of the rock shaft 302 simply moves away from the bell-crank 298.

A back-spacer key 326 is provided, which may be used to back-space the carriage 35 when it is desired to make a correction. The back-spacer key when actuated rocks a shaft 327, having an arm 328 thereon to pull downwardly on a link 330 to swing a pawl 331 into effective relation with the teeth on the feed rack 47. The forward swinging movement of the pawl 331 is stopped by a lever 332, upon which the pawl 331 is pivotally mounted. After the lever 332 is arrested against the feed rack 47, the pawl is swung about its pivot 333 to move the carriage back one letter-space distance. The back-spacing mechanism may be like that disclosed in the patent to Helmond, No. 930,962.

When the carriage is back-spaced into the computing zone, or while in the computing zone, the tappets 225, under ordinary conditions, would swing about their pivots to their ineffective positions, which would be objectionable. To avoid this, however, there is provided means controlled by the back-spacer key to swing the cams or engaging portions 226 of the totalizer selector levers 227 out of effective relation with the tappets 225. This means may comprise an arm 334, extending rearwardly from the rock shaft 327, to move a connecting link 335 upwardly when the back-spacer key is actuated, said link being connected to an arm 336, extending forwardly from the rock shaft 302, to actuate the latter, and consequently swing the fulcrum rod 75 rearwardly to move the levers 227 to their ineffective position, thus avoiding any frictional contact between the tappets 225 and the levers 227, which would otherwise tend to render the tappets 225 ineffective during a back-spacing operation. After the back spacing operation, the levers 227 are again permitted to move forwardly to properly engage the tappets 225.

The carriage may be rapidly positioned denominationally in any one of a plurality of columns by a set of decimal tabulator keys 337. Each tabulator key, when actuated, swings a lever 338 about a fulcrum 340 to move a plunger 341, associated therewith, upwardly to bring the upper end thereof, comprising a denominational stop or counter stop 342, into the path of a column stop 343, forming part of the body portion 65 of the selector on the typewriter carriage. When the plunger 341 moves upwardly, it engages with a universal bar 344, to rock a shaft 345, having an arm 346 thereon, to pull downwardly on a link 347 and swing a lever 348 about its pivot 350, to raise the feed rack 47 out of mesh with the pinion 46, by means of a roller 350$^a$ on the front end of the lever 348. The carriage 35 is immediately drawn to the left by the spring drum 38 until it is arrested by the column stop 343 engaging with a projected counter stop 342.

Provision is made to prevent the tappets 225 from striking the cams 226 on the levers 227 during a tabulating operation of the carriage. For this purpose, the rock shaft 345, to which the universal release bar 344 is secured, has a rearwardly-extending arm 351 which, when the rock shaft 345 is actuated, swings upwardly to actuate a link 352, connected to the arm 336, to rock the shaft 302, to cause the fulcrum rod 75 to be moved rearwardly, as previously described, to take the levers 227 out of engaging relation with the tappets 225. The links 335 and 352 have slots 353 and 354, respectively, at their lower ends so that they may be actuated independently of each other.

The totalizers have individual shutters 355 associated therewith, which normally cover the numerals on the dial wheels 106 so that they cannot be observed through the sight-openings 133. When a totalizer is selected, an interponent 357, which may be carried by the associated totalizer selector bar 234, is moved forwardly therewith and into the path of a cam 358, (Figure 8), on the carry-over shaft 138. The cam 358 engages with the interponent 357 during the latter part of the rotative movement of the carry-over shaft 138 to depress the interponent 357 (Figure 13) and swing a lever 360 about its fulcrum 361 on the plate 112, the lever 360 having a pin-and-slot connection 362 with the interponent. The lever 360 normally serves as a latch for the shutter, but as it is swung out of holding relation therewith, a spring 363 connected between the lever 360 and the shutter 355 swings said shutter about the rod 122, upon which the dial wheels 106 are rotatively mounted, to uncover the numerals on said dial wheels at the sight-opening 133. As soon as the carriage moves out of the computing zone, the totalizer selector bar 234 returns to its normal position and swings the shutter 355 to cover the numerals on the dial wheels. This may be done by means of a projection 365 on the totalizer selector bar 234, to engage with a projection 366 on the shutter. When the shutter reaches its normal position, the lever 360 snaps into holding position behind a nose 367 on said shutter. It should be understood that each shutter 355 is provided with means to selectively actuate the same as above described.

Each totalizer is provided with a clearance-printing key 368, (Figures 1, 4 and 6), to print a sign, preferably a star, the keys being actuable only when the corresponding totalizers have been rendered effective and when the dial wheels of the selected totalizers are at "0". Ordinarily the keys 368 are locked against actuation by locking members in the form of bails 370, pivotally mounted at 371 on the side plates 111 and 112 of the totalizers. As the carriage enters the computing zone, one of the totalizer selector bars 234 may be moved forwardly, as herein described. The totalizer selector bar tends to swing the locking member 370 out of locking relation with the key 368, the bar being yieldingly connected to the locking member by a spring 372. If any one of the dial wheels occupies a position other than "0", the locking member is prevented from unlocking the key 368, and consequently the latter cannot be actuated. For this purpose, there is provided a set of intermediate elements 373, pivotally mounted on the rod 115, said elements engaging with the gear wheels 136 of the various dial wheels. Each gear wheel is provided with a depression 374 which is so positioned relatively to the numerals on the dial wheels that the associated controlling element 373 may drop into the depression when "0" is opposite the sight-opening 133. (Figure 6). When all the dial wheels are in their "0" positions, the locking member 370 is swung to its ineffective position, (Figure 8), by the spring 372, if the totalizer selector bar 234 has been previously actuated. Suitable springs (not shown) may hold the elements 373 against the gear wheels 136.

To clear the totalizer, or, in other words, to set all the dial wheels back to "0," the machine is set to subtraction and the carriage is moved to the proper position to select the totalizer. The general operator may then be reciprocated to actuate the shutter to expose the registered number in the totalizer. The operative then types the number shown in the totalizer and actuates the general operator, and, since the machine is set to subtraction, the dial wheels on the totalizer are restored to their "0" positions. The intermediate controlling members 373 all drop into the notches 374, and the spring 372 swings the locking member to release the key 368, (Figure 8).

Each key 368, when actuated, engages an arm 375* extending from a shaft 375, (Figures 1 and 4), to rock the latter and swing a single arm 376 extending rearwardly therefrom, to engage with an arm 377 to rock a shaft 378 and actuate an upwardly-extending arm 380, which normally engages under a pin 381 on a link 382, pivotally connected at 383 to a pivoted member 384. When the arm 380 is moved out of the path of the pin 381, a spring 385 actuates the member 384 to pull downwardly on a link 386, connected to a lever 387 to swing one of the bell-cranks 29 connected therewith and actuate the type-bar having a star type thereon, to print against the platen 33. It will be understood that the rock-shaft 375 is provided with several arms 375*, one for each key 368, so that the rock-shaft may be actuated by any one of said keys to release the star-type printing mechanism. The key-lever 387 connected to the star type-bar may be restored to its normal position during the actuation of the general operator, a cam 389 on the carry-over shaft 138 being provided for this purpose, said cam engaging with a roller 389* on the member 384 to move the latter back to its normal position against the tension of the spring 385.

From the foregoing, it will be understood that if a totalizer selector bar 234 remains unactuated, the shutter 355 associated therewith also remains unactuated and consequently covers the sight-opening 133. From this it follows that the shutters 355, when they cover the sight-openings, serve as indicators to inform the operative that none of the star keys 368 can be actuated, except the one which is indicated by the open shutter.

To restore the locking members 370 to their normal locking positions, the totalizer selector bars 234 are provided with fingers 388, engaging with projections 390 on the locking members 370.

Provision is made to retain one of the totalizers constantly effective, so that it may serve as a cross-totalizer. For this purpose, the totalizer selector lever 227, associated with said totalizer, has a hook-like projection 391 thereon (Figures 1, 3 and 17), to engage, when the lever 227 is in its actuated position, in back of a pin 392 which may be placed in a hole 393 in a guide-plate 394 for the denomination-selecting levers 74. Thus, the interponent 235 associated with the totalizer selector bar 234, connected with the totalizer selector lever 227, may be held in its effective position indefinitely, and consequently any time the general operator is actuated, the totalizer is connected to the drivers 100. The pin 392, when out of use, may be placed in a hole 395 (Figure 17) in the guide-plate 394.

Variations may be resorted to within the scope of the invention, and portions of the improvements may be used without others.

Having thus described my invention, I claim:

1. In a combined typewriting and computing machine, the combination of a letter-feeding carriage, a plurality of totalizers, each totalizer comprising computing elements, a set of variably movable drivers for all said totalizers, a set of interponents for each totalizer normally disconnected therefrom, and means including an element on said carriage to selectively move the interponents of said sets into position to cooperate with the corresponding totalizers.

2. In a combined typewriting and computing machine, the combination of a letter-feeding carriage, a plurality of totalizers, each totalizer comprising computing elements, a set of variably movable drivers for all said totalizers, a set of interponents for each of said totalizers normally disconnected from both said computing elements and said drivers, and carriage-controlled means to selectively move different sets of interponents into effective relation to connect the computing elements of any totalizer with said drivers.

3. In a combined typewriting and computing machine, the combination of a letter-feeding carriage, a plurality of totalizers, each totalizer comprising computing wheels, a set of variably movable drivers, a plurality of selectors on said carriage, one for each group of totalizers to be actuated simultaneously, and a plurality of bail-like members, one for each totalizer and engageable by the proper selectors to render and maintain the selected totalizers effective by connecting their computing wheels with said drivers.

4. In a combined typewriting and computing machine, the combination of a letter-feeding carriage, a selector on said carriage, a pivoted tappet on said selector, a lever actuable by the tappet on said selector, and means settable by said lever, said lever having a toothed engaging portion thereon with which the tappet may engage to be rendered effective after the tappet has been rendered ineffective by moving said carriage backward.

5. In a combined typewriting and computing machine, in combination, a traveling carriage, computing mechanism including a controlling member having an engaging portion of approximately the length of a computing zone, a selector on said carriage, a tappet pivoted on said selector and connected therewith so as to actuate said controlling member during the letter-feeding movement of the carriage through the computing zone, and to turn on its pivot during the return movement of the carriage through said zone, urging means tending to return the tappet to effective position when displaced therefrom, and means to insure the return of the tappet to effective position upon advancing the carriage after rendering the tappet ineffective by backing the carriage into the computing zone.

6. In a combined typewriting and computing machine, in combination, a traveling carriage, computing mechanism including a plurality of controlling members therefor, said controlling members determining a computing zone, a supporting device common to said controlling members, a selector adjustable to letter-space positions on said carriage, a tappet member having tappets thereon in accordance with the controlling members to be actuated, said tappet member having a limited movement on said selector, means including a fixed guiding member to accurately position the tappet member on the selector in passing through the computing zone, a non-compute key, and means actuable by said non-compute key to move said controlling members out of effective relation with the tappets on the tappet member.

7. In a combined typewriting and computing machine, the combination of a carriage, computing mechanism comprising a set of levers which determine a computing zone, a selector, a tappet member constructed to operate selected levers, a support for said tappet member having limited movements on said selector, and means including a fixed guide member to accurately position said tappet member for engagement with the selected levers of said set.

8. In a combined typewriting and computing machine, the combination of a letter-feeding carriage, a plurality of totalizers, driving means for said totalizers, a plurality of connecting members, one for each totalizer, a plurality of selectors on said carriage, each selector having a pivoted member thereon, and each pivoted member having a tappet and a roller thereon; and a guide with which the rollers of the various pivoted members may engage to hold the tappets in effective relation with the associated connecting members.

9. In a combined typewriting and computing machine, in combination, a carriage, computing mechanism comprising a set of controlling members which determine a computing zone, a member adjustable at letter-space intervals on said carriage, a tappet member for actuating said controlling members, mounted on said adjustable member to enable adjustment of the tappet member on said adjustable member to obtain the proper degree of actuation of said controlling members, and automatic means for accurately positioning said tappet member on said adjustable member during its passage through the computing zone.

10. In a combined typewriting and computing machine, the combination of a letter-feeding carriage; a plurality of totalizers comprising computing wheels arranged in denominational order; a set of variably movable elements; a set of devices associated with said variably movable elements; a set of totalizer-connecting members; one for each totalizer; a plurality of selectors on said carriage; each selector having a tappet member mounted thereon so as to enable a slight adjustment of the latter on the former, each tappet member having a totalizer-selecting tappet and a denomination-selecting tappet; a roller on each tappet member; and a guide with which the roller may engage to adjustably position the tappet member to insure the desired degree of operation by said tappet member of the totalizer-connecting members and said devices while the carriage traverses a computing zone.

11. In a combined typewriting and computing machine, the combination of a letter-feeding carriage; a plurality of totalizers comprising computing wheels arranged in denominational order; a set of variably movable elements; a set of denomination-selecting levers associated with said variably movable elements; a set of nested bails having cams thereon, one for each totalizer, the denomination-selecting levers being grouped in the set of bails, so that the cams lie above said levers; a plurality of selectors on said carriage; each selector comprising a tappet member having a totalizer-selecting tappet, to engage with one of said cams, to connect the computing wheels with the variably movable members, and a denomination-selecting tappet to engage with said levers; a roller on each tappet member; and a guide bar located near said bails and levers, so that the roller may engage therewith to retain the tappet member in effective relation with the cams on said bails and said selecting levers while the carriage traverses a computing zone.

12. In a combined typewriting and computing machine, the combination of a carriage to traverse a computing zone, computing mechanism comprising subtraction-setting mechanism under the control of a pivoted lever, a device on said carriage to actuate said lever, said device being shiftable to and from effective position and a guide to hold said device in effective relation with said pivoted lever while the carriage is traversing the computing zone.

13. In a combined typewriting and computing machine, the combination of a letter-feeding carriage; a plurality of totalizers comprising computing wheels arranged in denominational order; a set of variably movable elements; a set of devices associated with said variably movable elements; a set of totalizer-connecting members, one for each totalizer; subtraction-setting mechanism; a subtraction member to render said mechanism effective; a plurality of selectors on said carriage; each selector comprising a tappet member pivoted thereon, each tappet member having a register-selecting tappet, and a denomination-selecting tappet, one of said selectors comprising a subtraction tappet to actuate said subtraction member, a roller on each tappet member; and a guide with which the roller may engage to retain the tappet member in effective relation with the totalizer-connecting members, said devices, and said subtraction member, while the carriage traverses a computing zone.

14. In a combined typewriting and computing machine, in combination, a traveling carriage, a letter-space rack thereon, a stop settable on said rack, a tappet member thereon to control the operation of the computing mechanism while passing through a computing zone, and means including a fixed guide for shifting the tappet member on the stop to accurately position the former on the latter.

15. In a combined typewriting and computing machine, the combination of a traveling carriage, computing mechanism comprising a set of levers pivoted on a common fulcrum, a device on said carriage to actuate said levers, case-shifting means, and means actuated by said case-shifting means to swing said fulcrum, to move said levers out of effective relation with said device.

16. In a combined typewriting and computing machine, the combination of a traveling carriage, computing mechanism comprising a set of levers pivoted on a common fulcrum, a selector on said carriage to actuate said levers, a non-compute key, and means actuated by said key to swing said fulcrum, to move said levers out of effective relation with said selector.

17. In a combined typewriting and computing machine, the combination of a letter-feeding carriage, a plurality of totalizers, driving means for said totalizers, selectors on said carriage, a plurality of totalizer-connecting levers having engaging portions in the path of said selectors, each lever having connected thereto a train of mechanism extending to the corresponding totalizer, a fulcrum for said levers, and means to shift said fulcrum to swing said levers about their connections with the trains of mechanisms, to take the engaging portions out of engaging relation with said selectors.

18. In a combined typewriting and computing machine, the combination of a traveling carriage, computing mechanism comprising a plurality of totalizers, a set of totalizer selector levers pivoted on a common fulcrum, a device on said carriage to actuate said levers to render the totalizers effective, and key-actuated means to swing said fulcrum, to move said totalizer selector levers out of effective relation with said device.

19. In a combined typewriting and computing machine, the combination of a traveling carriage, computing mechanism comprising a plurality of totalizers, a set of totalizer selector levers pivoted on a common fulcrum, a selector on said carriage to actuate said levers, a non-compute key, and means actuated by said key to swing said fulcrum, to move said totalizer selector levers out of effective relation with said selector.

20. In a combined typewriting and computing machine, the combination of a traveling carriage, computing mechanism comprising a plurality of totalizers, a set of totalizer selector levers pivoted on a common fulcrum, a selector on said carriage to actuate said levers, tabulating means for said carriage, said means comprising keys, and means actuable by said keys to swing said fulcrum, to move said totalizer selector levers out of effective relation with said selector during a tabulating operation of said carriage.

21. In a combined typewriting and computing machine, the combination of a traveling carriage, computing mechanism comprising a plurality of totalizers, a set of totalizer selector levers pivoted on a common fulcrum, a selector on said carriage to actuate said levers, a back-spacer for said carriage, and means actuable by said back-spacer to swing said fulcrum, to move said totalizer selector levers out of effective relation with said selector during a back-spacing operation of said carriage.

22. In a combined typewriting and computing machine, the combination of a letter-feeding carriage, a plurality of totalizers, a plurality of selectors, one for each totalizer; a plurality of totalizer-connecting levers having engaging portions in the path of said selectors, each lever having connected at one end a train of mechanism extending to one of the totalizers; a fulcrum for said levers; a rock shaft; said fulcrum being supported on said rock shaft; a non-compute key; a case-shift; and a tabulator key connected with said rock shaft, to actuate the latter, to shift said fulcrum, to swing said levers about their connections with the trains of mechanisms to take the engaging portions out of engaging relation with said selectors.

23. In a combined typewriting and computing machine, the combination of a traveling carriage, computing mechanism comprising a subtraction-setting lever, a fulcrum for said lever, a device on said carriage to actuate said lever, and key-actuated means to swing said fulcrum, to move said lever out of effective relation with said device.

24. In a combined typewriting and computing machine, the combination of a traveling carriage, computing mechanism comprising a subtraction-setting lever, a fulcrum for said lever, a selector on said carriage to actuate said lever, a non-compute key, and means actuated by said key to swing said fulcrum, to move said subtraction-setting lever out of effective relation with said selector.

25. In a combined typewriting and computing machine, the combination of a traveling carriage, computing mechanism comprising a subtraction-setting lever, a fulcrum for said lever, a selector on said carriage to actuate said lever, tabulating means for said carriage, said means comprising keys, and means actuable by said keys to swing said fulcrum, to move said subtraction-setting lever out of effective relation with said selector during a tabulating operation of said carriage.

26. In a combined typewriting and computing machine, the combination of a traveling carriage, computing mechanism comprising a subtraction-setting lever, a fulcrum for said lever, a selector on said carriage to actuate said lever, a back-spacer for said carriage, and means actuable by said back-spacer to swing said fulcrum, to move said subtraction-setting lever out of effective relation with said selector during a back-spacing operation of said carriage.

27. In a combined typewriting and computing machine, in combination, a traveling carriage, a rack on said carriage, a stop settable at letter-space distances on said rack, a plurality of members for controlling the computing operation, the free ends of said members being adjacent said rack, a tappet-carrier mounted on said stop for movement to and from said members, and means including a fixed guide for accurately positioning said tappet-carrier to properly engage said controlling members.

28. In a combined typewriting and computing machine, the combination of a traveling carriage, computing mechanism comprising numeral keys, a set of levers pivoted on a common fulcrum, a device on said carriage to actuate said levers, means actuable by said pivoted levers to lock said numeral keys, a non-compute key, and means actuable by said non-compute key to swing said fulcrum, to move said levers out of effective relation with said device.

29. In a combined typewriting and computing machine, in combination, a traveling carriage, a stop settable thereon, a tappet for controlling the computing mechanism, mounted on said stop for limited movement thereon, and means including a fixed guiding device for accurately positioning said tappet on said stop while passing through a computing zone.

30. In a combined typewriting and computing machine, the combination of a traveling carriage, computing mechanism comprising numeral keys, a set of levers pivoted on a common fulcrum, a device on said carriage to actuate said levers, means actuable by said pivoted levers to lock said numeral keys, a back-spacer for said carriage, said back-spacer comprising a key, and means actuable by said back-spacer to swing said fulcrum, to move said pivoted levers out of effective relation with said device during a back-spacing operation of said carriage.

31. In a combined typewriting and computing machine, in combination, a plurality of totalizers, a set of master drivers, a set of controlling members settable to actuate said master drivers either additively or subtractively, and means whereby said totalizers may be selectively connected with said master drivers.

32. In a combined typewriting and computing machine, in combination, a plurality of totalizers, a set of master drivers, a set of controlling members settable to actuate said master drivers either additively or subtractively, a carriage, and carriage-controlled means to selectively connect said totalizers with said master drivers.

33. In a computing machine, the combination of a plurality of totalizers; a set of actuable drivers; plurality of connecting elements, one for each totalizer; actuating means; said actuating means comprising a rock shaft, and fingers on said rock shaft; totalizer selector devices, interponents, one connected with each selector device, each interponent associated with one of the connecting elements; and means to selectively actuate said totalizer selector device to bring certain of said interponents into co-operative relation with the fingers on said rock shaft and the associated connecting elements, so that the latter may when actuated connect the corresponding totalizers with said drivers.

34. In a combined typewriting and computing machine, the combination of a letter-feeding carriage; a plurality of totalizers; each totalizer comprising a set of computing wheels; a set of actuable drivers; each totalizer having a set of intermediate elements having a movable support; each support having an actuating member; actuating means comprising a rock shaft and a plurality of fingers thereon, one for each actuating member; totalizer selector bars; each selector bar having an interponent connected therewith; and means on the carriage to selectively actuate said selector bars to bring the connected interponents into effective relation with the fingers on said rock shaft and the corresponding actuating members, so that the supports may be actuated by said actuating means to connect the intermediate elements with the drivers and the computing wheels of the selected totalizers.

35. In a computing machine, the combination of a plurality of totalizers, each totalizer comprising a set of computing dial wheels; a set of variably movable elements; means to determine the extent of movement of said variably movable elements; a plurality of sets of intermediate transfer members; totalizer-selecting means; and actuating means, dependent for its effectiveness upon the totalizer-selecting means, to shift any set of transfer members to connect the same with the dial wheels of the associated totalizer and the variably movable elements, said actuating means being also effective to drive said variably movable elements.

36. In a computing machine, the combination of a plurality of totalizers, each totalizer comprising a set of computing dial wheels; a set of variably movable elements; means to determine the extent of movement of said variably movable elements; a plurality of sets of intermediate transfer devices, one set for each totalizer, each set of transfer devices having a supporting element upon which the transfer devices are slidingly supported, each support having an actuating member, a general operator, a plurality of interponents, one associated with each actuating member, and means to selectively render any one of said interponents effective so that the supporting element may be actuated by the general operator, to bring the transfer members into driving relation with the dial wheels and the variably movable elements, the general operator being effective to drive the variably movable elements.

37. In a computing machine, the combination of a plurality of totalizers, each totalizer comprising computing wheels, a set of master drivers therefor, a set of controlling members for said drivers, intermediate transfer members, a support for each set of transfer members, settable totalizer-selecting devices to actuate the supports to connect the computing wheels of the associated totalizers with the master drivers through the medium of the transfer members, and means to actuate the controlling members after the totalizers have been connected.

38. In a computing machine, the combination of a plurality of totalizers, each totalizer comprising a set of computing wheels; a set of master drivers for said totalizers; a set of controlling members for said drivers; a set of transfer members for each totalizer; a support for each set of transfer members; settable totalizer-selecting devices; means to actuate the set selecting devices, to actuate the supports to connect the computing wheels of the associated totalizers with the master drivers through the medium of the transfer members; means to actuate the controlling members, after one or more totalizers have been connected, to actuate the master drivers and transfer members connected therewith; means to effect a movement of the supports to take the transfer members out of engagement with the computing wheels prior to the restoration of the transfer members; and means to restore said transfer members.

39. In a computing machine, the combination of a plurality of totalizers, each totalizer comprising a set of computing wheels, a set of master drivers for said totalizers, a set of controlling members for said drivers, a general operator for said controlling members, a set of intermediate transfer members for each totalizer, a support for each set of transfer members, settable totalizer-selecting devices, means including a member connected with the general operator, a rock shaft, a yielding member on said rock shaft engaged by the member connected with the general operator to actuate the set-selecting devices and actuate the supports to connect the computing wheels of the associated totalizers with the master drivers through the medium of the transfer members, means to actuate the controlling members after the totalizers have been connected to actuate the master drivers and transfer members connected therewith, said yielding member being effective to yield when the general operator is moved to its normal position, so as to allow the supports to move to take the transfer members out of effective driving relation with the computing wheels and the master drivers, and means on said general operator to restore said transfer members.

40. In a computing machine, the combination of a totalizer, computing elements in said totalizer, a set of drivers, a set of settable controlling elements connected with said drivers, a set of transfer elements, and operating means, said operating means being effective to connect said transfer elements with said computing elements and said drivers, and actuate said controlling elements.

41. In a combined typewriting and computing machine, the combination of a letter-feeding carriage, totalizers, computing elements in each totalizer, a set of drivers, a set of variably settable controlling elements for said drivers, a set of transfer elements, operating means, said operating means being effective to connect said transfer elements with said computing elements, and said drivers and actuate said controlling elements, and means on the typewriter carriage to selectively determine which of the totalizers should be connected by the operating means.

42. In a combined typewriting and computing machine, in combination, a plurality of totalizers, a set of master drivers, a set of controlling elements settable to actuate said master drivers either additively or subtractively, a general operator for said controlling elements, carriage-controlled means for selecting the totalizers in which computation is to be effected, and means whereby, upon actuation of said general operator, a driving connection will be established between the controlling elements and the selected totalizers, and the latter actuated by the former in accordance with the setting on the controlling elements.

43. In a computing machine, the combination of a plurality of totalizers arranged side by side, each totalizer having a movable selecting device associated therewith, a group of actuating elements, one associated with each selecting device, the selecting devices being adapted to move in planes parallel to planes in which the actuating elements move and offset to one side thereof, and pivoted bails connecting said selecting devices and said actuating elements.

44. In a combined typewriting and computing machine, the combination of a letter-feeding carriage, a plurality of totalizers arranged side by side and crosswise of the machine, selector bars, one for each totalizer, actuating levers, bails connecting said selector bars with said actuating levers, and means on the carriage to selectively actuate said actuating levers, said selector bars being adapted to move in planes to one side of and parallel to planes in which the actuating levers move, and said bails extending crosswise of the machine from the actuating levers to the selector bars.

45. In a combined typewriting and computing machine, in combination, a carriage, a plurality of totalizers, each comprising a set of pinions, one for each denomination, indexing means in which a number typed may be indexed either for addition or subtraction, a set of master drivers actuated in accordance with the indexing in the corresponding denominations, a set of racks for each totalizer adapted to mesh with the pinions of the totalizer but normally separated therefrom, carriage-controlled means for determining the totalizers to be used in a given computing zone, and means whereby actuation of the master drivers in accordance with the indexing will be preceded by movement of the racks corresponding to the selected totalizers into mesh with the pinions belonging thereto.

46. In a combined typewriting and computing machine, the combination of a letter-feeding carriage, a plurality of totalizers, a plurality of bail-like actuating members, one for each totalizer, a plurality of selectors on said carriage, the actuating members having cams thereon with which the selectors on said carriage may engage to actuate said actuating members, selector bars, one for each totalizer, pivoted bails connecting the actuating members with the selector bars, interponents connected with said selector bars and settable thereby, and means to actuate said interponents after they are set to render the associated totalizers effective.

47. In a combined typewriting and computing machine, the combination of a letter-feeding carriage, a plurality of totalizers, each totalizer having a set of computing wheels, a single set of variably movable drivers, devices on the carriage to selectively connect the totalizers with the drivers, means to actuate said drivers, and means to retain one of said totalizers connected with said drivers.

48. In a combined typewriting and computing machine, the combination of a letter-feeding carriage, a plurality of totalizers, each totalizer having a set of computing wheels, a single set of variably movable drivers, devices on the carriage, means including levers actuable by the devices on said carriage to selectively connect the totalizers with said drivers, and means to retain one of said levers in its actuated position to hold the totalizer controlled thereby connected with said drivers.

49. In a combined typewriting and computing machine, the combination of a machine frame, a letter-feeding carriage, a plurality of totalizers, each totalizer having a set of computing wheels, a single set of variably movable drivers, devices on the carriage, means including levers actuable by the devices on said carriage to selectively connect the totalizers with said drivers, and means to retain one of said levers in its actuated position to hold the totalizer controlled thereby connected with said drivers, the retaining means comprising a hook on the lever and a detachable pin on the machine frame to engage with said hook.

50. In a computing machine, the combination of a totalizer comprising a series of computing elements arranged side by side in denominational order, a series of variably settable controlling elements arranged side by side in a reverse denominational order, and intermediate means connecting the computing elements in their successive order from lowest to highest denominations with the controlling elements of lowest to highest denominations, respectively.

51. In a combined typewriting and computing machine, in combination, typewriting mechanism and mechanism for computing numbers typed, comprising a plurality of totalizers, each including a set of denominational members, a set of master drivers, one for each denomination, a set of denominational elements settable either additively or subtractively for the numbers typed, and connected with said master drivers to actuate the same, and sets of connectors selectively shiftable into operative relation with the denominational members of said totalizers to enable actuation of the latter by the master drivers.

52. In a computing machine, the combination of a totalizer comprising a set of computing wheels, controlling elements for said computing wheels, transposition devices, and a general operator to actuate said controlling elements and said transposition devices to rotate said computing wheels.

53. In a combined typewriting and computing machine, the combination of a letter-feeding carriage, a totalizer comprising a set of computing wheels, a set of controlling elements having pins thereon, pin-setting devices, members actuable by the carriage as it travels from right to left to render the controlling elements individually effective with said pin-setting devices, said controlling elements being arranged with the one of highest denominational order toward the right-hand side of the set, transposition devices between said controlling elements and said computing wheels, and means to actuate said controlling elements collectively.

54. In a combined typewriting and computing machine, the combination of a letter-feeding carriage, a totalizer comprising a set of computing wheels, a set of drivers, a set of controlling elements having pins thereon, pin-setting devices, members actuable by the carriage as it travels from right to left to render the controlling elements individually effective with said pin-setting devices, said controlling elements being arranged with the one of highest denominational order toward the right-hand side of the set, intermediate transfer elements for said computing wheels, a set of shafts extending crosswise of said controlling elements and said transfer elements, connections between said controlling elements and said shafts, the set of connections being diagonally disposed relatively to said drivers, and connections between said drivers and said transfer elements, said connections being diagonally disposed relatively to said drivers and crosswise of the first-mentioned set of connections.

55. In a computing machine, the combination of a totalizer comprising a series of computing wheels arranged side by side in denominational order, a series of controlling racks arranged side by side in a reverse denominational order, intermediate transfer racks for said computing wheels, a set of shafts extending crosswise of said controlling racks and said transfer racks, a set of pinions on said shafts, the set extending diagonally crosswise of said shafts and connecting said controlling racks with said shafts, and a second set of pinions on said shafts, the last-named set of pinions extending diagonally crosswise of said shafts and in a direction crosswise of the direction of the first-mentioned set of pinions, the second-mentioned pinions connecting said shafts with said transfer racks.

56. In a combined typewriting and computing machine, the combination of a letter-feeding carriage, a totalizer comprising a set of computing wheels, a set of controlling racks having pins thereon, pin-setting devices, members actuable by the typewriter carriage as it travels from right to left to render the controlling racks individually effective with said pin-setting devices, said controlling racks being arranged with the one of highest denominational order toward the right-hand side of the set, transfer racks for said computing wheels, a set of shafts extending crosswise of said controlling racks and said transfer racks, a set of pinions on said shafts, said set of pinions extending diagonally crosswise of the set of shafts and connecting the controlling racks with said shafts, and a second set of pinions on said shafts, the latter set of pinions extending diagonally crosswise of the set of shafts and crosswise of the direction of the first-mentioned set of pinions, said second-mentioned set of pinions connecting said shafts with said transfer racks.

57. In a computing machine, the combination of a plurality of totalizers, each totalizer comprising a series of computing wheels arranged side by side in denominational order, a single set of controlling elements arranged side by side in a reverse denominational order, transposition devices to be actuated by said controlling elements, and means to selectively connect the computing wheels of any totalizer with said transposition devices.

58. In a computing machine, the combination of a plurality of totalizers, each having a set of computing wheels, a single set of controlling racks, a plurality of sets of transfer racks, one set for each totalizer, a set of shafts extending crosswise of the controlling racks and the transfer racks, a set of pinions on said shafts, the set of pinions extending diagonally crosswise of said shafts and connecting said controlling racks with said shafts, and a plurality of sets of pinions on said shafts, one set for each totalizer, said plurality of sets of pinions extending diagonally crosswise of said shafts and in directions crosswise of the first-mentioned set of pinions, and connecting said shafts with the transfer racks associated with the various totalizers.

59. In a combined typewriting and computing machine, the combination of a letter-feeding carriage, a totalizer comprising a set of computing wheels, controlling elements for said computing wheels, each controlling element having a set of pins thereon, numeral keys, pin-setting devices controlled by said numeral keys, intermediate pin bars between said controlling elements and said pin-setting devices, means, including a denomination selector on said carriage, to actuate said intermediate pin bars individually so as to render the associated controlling elements effective with said pin-setting devices, and means, including transposition devices, whereby actuation of said controlling elements may cause actuation of said computing wheels.

60. In a computing machine, the combination of a plurality of totalizers, each totalizer having a set of computing wheels rotatable about a fixed axis, a single set of controlling elements, said controlling elements being settable additively and subtractively, a set of master drivers, said totalizers being selectively connectable with said master drivers, and means to actuate said controlling elements to actuate said drivers.

61. In a combined typewriting and computing machine, the combination of numeral keys from "0" to "9", inclusive, a totalizer having dial wheels, controlling elements for said dial wheels, indexing pins from "0" to "9" on each controlling element, pin-setting devices connected one to each numeral key, and subtraction-setting mechanism to set the "9" pins, and to change the connections between the numeral keys and the pin-setting devices so that the indexing pins having the complemental values of the numeral keys may be set thereby, the pin-setting device associated with the "0" numeral key being disconnected so as to be ineffective, and the "0" numeral key being connected to the "9" pin-setting device when the machine is set to subtraction.

62. In a computing machine, the combination with a pin bar, of a series of pins settable on said bar, a pivoted universal latch to hold any one of said pins in its set position, a special release pin on said pin bar, and means to actuate said release pin to swing said latch to release the set pin.

63. In a computing machine, the combination with a pin bar, of a series of pins settable on said bar, a pivoted universal latch to hold any one of said pins in its set position, means to actuate said pin bar after a pin has been set, a release pin on said pin bar, and means operable by the actuating means during the latter part of the return movement of the pin bar to actuate said release pin to swing said latch and release the set pin.

64. In a computing machine, the combination of a totalizer comprising a set of computing wheels, a set of drivers, a set of transfer racks normally occupying ineffective positions, a movable support upon which said transfer racks are guided, means to actuate said support to bring the transfer racks into effective relation with the drivers and the computing wheels, and means to guide said support parallel to itself.

65. In a computing machine, the combination of a totalizer comprising a set of computing wheels, a set of drivers, a set of transfer racks normally occupying ineffective positions, a movable support upon which said transfer racks are guided, means to actuate said support to bring the transfer racks into effective relation with the drivers and the computing wheels, means to guide said support parallel to itself, said transfer racks being effective to be driven by said drivers after they are connected therewith to drive the computing wheels, and means to restore said transfer racks relatively to their support.

66. In a computing machine, the combination of a totalizer comprising a set of computing wheels, a set of drivers, a set of transfer racks normally occupying ineffective positions, a movable support upon which said transfer racks are guided, means to actuate the support to bring the transfer racks into effective relation with the drivers and the computing wheels, means to guide said support parallel to itself, said transfer racks being effective to be driven by said drivers after they are connected therewith to drive the computing wheels, means to actuate said support after the transfer racks have been driven, means to restore said transfer racks relatively to the support, and a spring-pressed universal bar effective near the end of the return movement of said transfer racks, to fully restore them to their normal positions relatively to the support.

67. In a computing machine, the combination of a totalizer having a set of computing wheels, a set of drivers, controlling elements for said drivers, a set of intermediate transfer racks, a support for the transfer racks, means to actuate said support to connect the transfer racks with said drivers and said computing wheels, a general operator to actuate said controlling elements to actuate said drivers to drive the transfer racks and to rotate the computing wheels, and means to actuate said support, after the transfer racks have been driven, to take the transfer racks out of effective relation with the drivers and the computing wheels, said general operator being effective to restore the transfer racks relatively to said support and return said controlling elements to their normal positions.

68. In a computing machine, the combination of a totalizer, computing elements in said totalizer, a set of drivers, a set of variably settable controlling elements for said drivers, a set of transfer elements, a movable support for said transfer elements, means to actuate the support to connect the computing elements with said drivers through the medium of said transfer elements, means to actuate the controlling elements, and means to insure the restoration of the support.

69. In a computing machine, the combination of a totalizer, computing elements in said totalizer, a set of drivers, a set of settable controlling elements for said drivers, a set of transfer elements, a movable support for said transfer elements, means to actuate said support to connect the computing elements with said drivers through the medium of said transfer elements, a cam and means actuable by said cam to insure the restoration of said support to normal position.

70. In a computing machine, the combination of a totalizer, computing elements in said totalizer, a set of drivers, a set of settable controlling elements for said drivers, a set of transfer elements, a movable support for said transfer elements, means to actuate said support to connect the computing elements with said drivers through the medium of said transfer elements, carry-over mechanism for said computing elements, and means associated with said carry-over mechanism to insure the restoration of said support.

71. In a computing machine, the combination of a totalizer, computing elements in said totalizer, a set of drivers, a set of settable controlling elements for said drivers, a set of transfer elements, a movable support for said transfer elements, means to actuate said support to connect the computing elements with said drivers through the medium of said transfer elements, carry-over mechanism for said computing elements, said carry-over mechanism comprising a shaft, a cam on said shaft, and means actuable by said cam to insure the restoration of said support.

72. In a computing machine, the combination of a totalizer, computing elements in said totalizer, a set of drivers, a set of settable controlling elements for said drivers, a set of transfer elements, a movable support for said transfer elements, means to actuate said support to connect the computing elements with said drivers through the medium of said transfer elements, a cam, a member connected to said support, said member being brought into effective relation with said cam when the support is actuated, means to actuate said controlling elements, and means to actuate said cam to insure the restoration of said support through the medium of the member connected to said support.

73. In a computing machine, the combination of a plurality of totalizers, each totalizer comprising a set of computing wheels, a set of master drivers for said totalizers, a set of controlling members for said master drivers, a plurality of sets of intermediate transfer members, movable supports, one for each set of transfer members, settable selector devices, one for each support, means to actuate said selector devices after they have been set, so that the supports may be actuated to connect the various sets of transfer members with the drivers, settable elements, one connected with each support, and means to engage with the settable elements to insure the restoration of said supports to their normal positions.

74. In a combined typewriting and computing machine, the combination of numeral keys, a plurality of totalizers, a set of drivers, controlling members settable by said keys, state-setting means to determine whether the controlling members should be set additively or subtractively, means, including connectors shiftable to effective and ineffective positions, to selectively connect one or more totalizers with said drivers, and means to actuate said controlling members to transfer the value of a set up number to the totalizers.

75. In a combined typewriting and computing machine, the combination of a letter-feeding carriage, subtraction-setting mechanism, a motor comprising a shaft for said subtraction-setting mechanism, holding means engaging with said shaft to prevent the actuation of said subtraction-setting mechanism by said motor, and means on said carriage to actuate said holding means to release said motor.

76. In a combined typewriting and computing machine, the combination of a letter-feeding carriage, subtraction-setting mechanism, a motor comprising a shaft to actuate said subtraction-setting mechanism, a disk secured to said shaft, a holding pawl to engage with said disk, and means engaged by said carriage to actuate said holding pawl to release said motor.

77. In a combined typewriting and computing machine, the combination of a letter-feeding carriage adapted to traverse a computing zone, subtraction-setting mechanism, a rotary motor for said subtraction-setting mechanism, holding means to prevent the actuation of said subtraction-setting mechanism by said motor, and means to actuate said holding means to release said motor as the carriage passes into the computing zone.

78. In a combined typewriting and computing machine, the combination of a letter-feeding carriage, subtraction-setting mechanism, a motor comprising a shaft for said setting mechanism, holding means engaging with said shaft to prevent the actuation of said subtraction-setting mechanism by said motor, means on said carriage to actuate said holding means to release said motor, computing elements, actuating means for said computing elements, and means actuable by said actuating means to rewind said motor.

79. In a combined typewriting and computing machine, the combination of a letter-feeding carriage, a set of pin bars having pins, including "9" pins, thereon, subtraction-setting mechanism including a rock shaft, a motor, holding means, means on said carriage to actuate said holding means to release said motor, a cam to be driven by said motor, said cam being effective to actuate said rock shaft, and means on said rock shaft to set the "9" pins.

80. In a computing machine, the combination of a set of pin-bars having pins including "9" pins thereon, numeral keys, pin-setting devices, rock-shafts associated with said setting devices, said rock-shafts being actuable by said numeral keys, subtraction-setting mechanism including a rock-shaft, a motor, holding means, means to actuate said holding means to release said motor so that the last-mentioned rock-shaft may be actuated thereby, means on said last-mentioned rock-shaft to set the "9" pins, and means on said last-mentioned rock-shaft to change the connections between the pin-setting devices and the associated rock-shafts.

81. In a combined typewriting and computing machine, the combination of a carriage to traverse a computing zone, subtraction-setting mechanism, a rotary motor for said setting mechanism, holding means, including a pawl, to prevent the actuation of said subtraction-setting mechanism by said motor, means to actuate said holding means to release said motor as the carriage passes into the computing zone, a latch to lock the holding pawl in its actuated position, computing elements, and actuating means for said computing elements, said actuating means being effective to actuate said latch to permit the pawl to assume its holding position.

82. In a combined typewriting and computing machine, the combination of a letter-feeding carriage, subtraction-setting mechanism, a motor comprising a shaft for said mechanism, a disk secured to said shaft, a holding pawl to engage with said disk, means engaged by said carriage to actuate said pawl to release said motor, a cam on said shaft to actuate said subtraction-setting mechanism, another cam on said shaft, a device actuable by the last-mentioned cam to lock said pawl in its actuated position, computing elements, and actuating means for said computing elements, said device being actuable by said actuating means to release said pawl to permit it to return to its holding position.

83. In a combined typewriting and computing machine, the combination of a letter-feeding carriage, subtraction-setting mechanism, a motor comprising a shaft for said mechanism, a disk secured to said shaft, a holding pawl to engage with said disk, means engaged by said carriage to actuate said pawl to release said motor, a cam on said shaft to actuate said subtraction-setting mechanism, another cam on said shaft, a slide operable by said last-mentioned cam, a latch to lock said slide to hold said pawl in its actuated position, computing elements, and actuating means for said computing elements, said actuating means being effective to actuate said latch to release said slide and permit the pawl to assume its holding position.

84. In a combined typewriting and computing machine, the combination of a letter-feeding carriage, subtraction-setting mechanism, a motor comprising a shaft for said mechanism, holding means engaging with said shaft to prevent the actuation of said subtraction-setting mechanism by said motor, means on said carriage to actuate said holding means to release said motor, and key-controlled means to actuate said holding means.

85. In a combined typewriting and computing machine, the combination of a letter-feeding carriage, a set of pin-bars having pins including "9" pins thereon, subtraction-setting mechanism including a rock shaft, a motor, holding means, means on said carriage to actuate said holding means to release said motor, a cam to be driven by said motor, said cam being effective to actuate said rock shaft, means on said shaft to set the "9" pins, and key-controlled means to actuate said holding means.

86. In a combined typewriting and computing machine, the combination of a letter-feeding carriage, a set of pin-bars having pins including "9" pins thereon, numeral keys, pin-setting devices, rock shafts connected with said setting devices, said rock shafts being actuable by said numeral keys, subtraction-setting mechanism including a rock shaft, a motor, holding means, means engaged by the carriage to actuate said holding means, to release said motor so that the subtraction rock shaft may be actuated thereby, key-controlled means to actuate the holding means at will, means on the subtraction rock shaft to set the "9" pins, and means on the subtraction rock shaft to change the connections between the pin-setting devices and the connected rock shafts.

87. In a combined typewriting and computing machine, the combination of a letter-feeding carriage, subtraction-setting mechanism, a motor comprising a shaft for said mechanism, holding means engaging with said shaft to prevent the actuation of said subtraction-setting mechanism by said motor, means on said carriage to actuate said holding means to release said motor, key-controlled means to actuate said holding means, said key-controlled means being operable by the means on the carriage or at the will of the operative, and a latch associated with said key-controlled means to lock the latter to hold said holding means in its actuated position.

88. In a combined typewriting and computing machine, the combination of a letter-feeding carriage, subtraction-setting mechanism, a motor comprising a shaft for said mechanism, a pawl to hold said shaft from rotating, means actuable by the carriage to actuate said pawl to release said shaft, a cam on said shaft to actuate said subtraction-setting mechanism, a bell-crank, a cam on said shaft to actuate said bell-crank, a slide-bar connected with said bell-crank, and a latch associated with said slide-bar.

89. In a combined typewriting and computing machine, the combination of a letter-feeding carriage, subtraction-setting mechanism, a motor comprising a shaft for said mechanism, a pawl to hold said shaft from rotating, means actuable by the carriage to actuate said pawl to release said shaft, a cam on said shaft to actuate said subtraction-setting mechanism, a bell-crank, a cam on said shaft to actuate said bell-crank, a slide-bar connected with said bell-crank, a latch associated with said slide-bar, and a key by which said slide-bar may be operated, at the will of the operative, to swing said bell-crank to actuate the holding pawl and release said shaft.

90. In a computing machine, the combination of subtraction-setting mechanism, actuating means for said subtraction-setting mechanism, and a rotary governor for said actuating means.

91. In a computing machine, the combination of a set of controlling members, indexing pins including "9" pins, subtraction-setting mechanism to set all of the "9" pins, actuating means for said subtraction-setting mechanism, and a rotary governor for said actuating means.

92. In a computing machine, the combination of a set of controlling members, indexing pins including "9" pins, subtraction-setting mechanism to set all of the "9" pins, actuating means for said subtraction-setting mechanism, and rotary means to prevent a snappy action of the "9" pins while they are being set.

93. In a computing machine, the combination of a set of controlling members, indexing pins including "9" pins, subtraction-setting mechanism to set all of the "9" pins, actuating means for said subtraction-setting mechanism, and means normally without influence on said setting mechanism but rendered effective upon actuation of the latter to restrain the same and thereby avoid a snappy setting action on the "9" pins.

94. In a computing machine, the combination of subtraction-setting mechanism, a motor to actuate said setting mechanism, holding means for said motor, means to actuate said holding means, so that the subtraction-setting mechanism may be actuated by said motor, and a governor for said motor.

95. In a computing machine, the combination of subtraction-setting mechanism, a spring, a shaft to be driven by said spring, holding means for said shaft, means to actuate said holding means to release said shaft, so that the subtraction-setting mechanism may be actuated by said spring, and a rotatable blade connected with said shaft to govern the speed thereof.

96. In a computing machine, the combination of subtraction-setting mechanism, a shaft, driving means for said shaft, holding means for said shaft, means to actuate said holding means to release said shaft, so that it may be driven by said driving means to actuate the subtraction-setting mechanism, means to rotate said shaft to energize said driving means, a governor, and means connecting said governor with said shaft in such a way that the governor is effective only when said shaft is driven by said driving means.

97. In a computing machine, the combination of a totalizer comprising computing elements, a normally effective shutter, means to actuate the computing elements, and means to actuate said shutter to expose the computing elements each time the computing elements are actuated.

98. In a computing machine, the combination of a totalizer comprising computing elements, a normally effective shutter, means to actuate the computing elements, carry-over means for said computing elements, and means associated with said carry-over means to actuate said shutter to expose the computing elements.

99. In a computing machine, the combination of a totalizer comprising computing elements, a shutter normally effective to cover said computing elements, settable means, means to actuate said computing elements, and means to actuate said settable means to render said shutter ineffective, thereby uncovering said computing elements each time the computing elements are actuated.

100. In a combined typewriting and computing machine, the combination of a letter-feeding carriage to traverse a computing zone, a totalizer comprising computing elements, a shutter to normally cover said computing elements, means to actuate said computing elements, means settable by the carriage as it enters the computing zone, and means to actuate said settable means after the computing elements have been actuated to render said shutter ineffective.

101. In a combined typewriting and computing machine, the combination of a letter-feeding carriage, a totalizer comprising computing elements, a shutter to normally cover said computing elements, and means to actuate said shutter to uncover said computing elements, the effectiveness of the actuating means being dependent upon the position of the carriage in its travel.

102. In a combined typewriting and computing machine, the combination of a letter-feeding carriage, a totalizer comprising computing elements, a shutter to normally cover said computing elements, an interponent settable by said carriage, and means to actuate said shutter to uncover said computing elements through the medium of said interponent after it is set.

103. In a combined typewriting and computing machine, the combination of a letter-feeding carriage to traverse a computing zone, a totalizer comprising computing elements, a shutter to normally cover said computing elements, means to actuate said computing elements, means settable by the carriage as it enters the computing zone, means to actuate said settable means after the computing elements have been actuated to render said shutter ineffective, and means to render said shutter effective as the carriage passes out of the computing zone.

104. In a combined typewriting and computing machine, the combination of a letter-feeding carriage to traverse a computing zone, a totalizer comprising computing elements, a shutter to normally cover said computing elements, means to actuate said computing elements, a slide-bar, a settable interponent connected with said slide-bar, a settable means, a device on said carriage to actuate said settable means to set the interponent as the carriage enters the computing zone, means to actuate said interponent to render said shutter ineffective after the computing elements have been actuated, and means to render said shutter effective as the carriage passes out of the computing zone.

105. In a computing machine, the combination of a totalizer comprising computing elements, a normally effective shutter, means to actuate the computing elements, carry-over means, and means actuable by said carry-over means to render said shutter ineffective.

106. In a computing machine, the combination of a plurality of totalizers, each totalizer having a set of computing elements, a plurality of shutters, one for each totalizer, means to actuate any one of said totalizers, and means to actuate the shutter of the selected totalizer to uncover the computing elements thereof.

107. In a computing machine, the combination of a plurality of totalizers, each totalizer having a set of computing elements, a plurality of shutters, one for each totalizer, a set of drivers, totalizer selector members, means to actuate said selector members, so that the totalizers may be selectively connected with said drivers, devices settable with said selector members, and means to actuate said devices after they are set, to actuate the shutters of the selected totalizers to uncover the computing elements of said totalizers.

108. In a computing machine, the combination of a totalizer comprising computing elements, driving means, a member to render said totalizer effective, a shutter for said computing elements, said member being effective to hold said shutter effective, an interponent connected with said member, an intermediate holding device connected with said interponent and said shutter, a co-operating device for said interponent, means to actuate said member to bring said interponent into effective relation with said co-operating device, means to actuate said co-operating device to release said shutter from said intermediate holding device, and means to move said shutter to an ineffective position.

109. In a computing machine, the combination of a plurality of totalizers, each having a set of computing elements, a plurality of shutters, one for each set of computing elements, means to actuate said computing elements, a shaft, devices on said shaft, members which may be selectively moved into effective relation with the devices, and means to actuate said shaft to actuate the selected members and thereby the corresponding shutters to uncover the computing elements.

110. In a computing machine, the combination of a totalizer having a set of computing wheels, means to drive said computing wheels, a type-key, a locking member for said key, a set of intermediate members, one for each computing wheel, each computing wheel having a notch in which the associated intermediate member may engage, and means to actuate said locking member to release said key when all of the intermediate members are in the notches, said means being yieldingly connected with said locking member.

111. In a computing machine, the combination of a totalizer having a set of dial wheels, means to drive said dial wheels, each dial wheel having a series of numbers from "1" to "0", inclusive, which may be observed through a sight-opening, a type-key, a locking member for said type-key, a set of intermediate members, one for each dial wheel, each dial wheel having a notch therein, which is so located relatively to the numbers that the associated intermediate member may engage therein when "0" is at the sight-opening, an actuator for said locking member, and a yielding connection between said actuator and said locking member, said locking member being actuable to release said type-key only when all of the intermediate members are in the notches.

112. In a computing machine, the combination of a totalizer having a set of computing wheels, means to drive said computing wheels, type-keys, a locking member for each type-key, a set of intermediate members, one for each computing wheel, each computing wheel having a notch therein, in which the associated intermediate member may engage, devices to actuate the locking members to release said keys when all of the intermediate members are in the notches, each device being yieldingly connected with one of the locking members, a rock-shaft actuable by any one of said type-keys, a type-bar, and means connected with said rock-shaft to effect the actuation of said type-bar.

113. In a computing machine, the combination of a plurality of totalizers, each totalizer comprising a set of dial wheels, each dial wheel having a notch therein, selector devices by which the totalizers may be selectively rendered effective, a plurality of type-keys, one for each totalizer, each type-key having a locking device associated therewith to prevent its actuation, and a plurality of sets of intermediate members, one set for each totalizer, said intermediate members engaging in the notches in the dial wheels, each selector device being effective to actuate the corresponding locking device only when all of the intermediate members of the corresponding totalizer are in the notches.

114. In a computing machine, the combination of a plurality of totalizers, each totalizer comprising a set of dial wheels, each dial wheel having a notch therein, selector devices by which the totalizers may be selectively rendered effective, a plurality of type-keys, one for each totalizer, each type-key having a locking device associated therewith to prevent its actuation, a plurality of sets of intermediate members, one set for each totalizer, said intermediate members engaging in notches in the dial wheels, the selector devices being effective to actuate the corresponding locking devices only when all of the intermediate members of the corresponding totalizers are in the notches, a shaft actuable by any one of said keys, a type-bar, and means connected to said shaft to effect the actuation of said type-bar.

115. In a combined typewriting and computing machine, the combination of a letter-feeding carriage, totalizers, each totalizer comprising a set of computing wheels, a set of drivers, selector devices actuable by the carriage to selectively render said totalizers effective, so that their computing wheels may be actuated by said drivers, a plurality of type-keys, one for each totalizer, each type-key having a locking member associated therewith, the locking members being actuable by the selector devices, and intermediate members associated with each set of computing wheels to determine whether or not the locking members of the selected totalizers may be actuated by the selector devices.

116. In a computing machine, the combination of a plurality of totalizers, each totalizer having a set of computing elements, a plurality of shutters, one for each totalizer, driving means for said computing elements, totalizer-selector members, means to actuate said selector members to selectively connect the totalizers with the driving means, means to actuate said devices after they are set to actuate the shutters of the selected totalizers to uncover the computing elements of the selected totalizers, and a plurality of type-keys, one for each totalizer, each type-key having a locking device associated therewith to prevent its actuation, the locking devices being under the control of the totalizer-selector members, the closed shutters of the unselected totalizers serving to indicate to the operator that their type-keys can not be actuated.

117. In a combined typewriting and computing machine, the combination of a plurality of totalizers, each having a set of dial wheels, type-keys, one for each totalizer, a set of elements associated with each set of dial wheels to determine when the type-keys of the associated totalizers may be actuated, a plurality of devices, one for each totalizer, driving means for the dial wheels of said totalizers, means to selectively connect the totalizers with said driving means, and means to effect the selective actuation of the devices associated with the selected totalizers, said devices serving as indicators to inform the operative in which totalizers the keys can not be actuated.

118. In a combined typewriting and computing machine, in combination, a carriage, a totalizer comprising a set of number wheels, a clearance-printing key, a lock for said key controlled by said carriage and said number wheels, and means to free said lock from control by said carriage when the carriage enters a computing zone for said totalizer.

119. In a combined typewriting and computing machine, in combination, a carriage, a plurality of totalizers, each comprising a set of number wheels, normally ineffective means, including a general operator, for actuating the number wheels of said totalizers, a device individual to each totalizer whereby the actuating means may be made effective on the number wheels of the totalizer, a clearance-printing key for each totalizer, locked against movement except when the number wheels of the totalizer are at "0," a device for each totalizer to prevent actuation of the corresponding clearance-printing key except in a computing zone, and a single element adjustably settable on said carriage and selected in accordance with the totalizers to be operated, to enable said actuating means to be effective on the selected totalizers, and to render ineffective the preventing means for the selected totalizers.

120. In a combined typewriting and computing machine, in combination, a carriage, a plurality of totalizers, each including a set of number wheels, clearance-printing means including a clearance key associated with each totalizer, means whereby each clearance key may be depressed only when the corresponding totalizer has a "0" setting, a device associated with each totalizer to prevent depression of the corresponding clearance key irrespective of the setting of the number wheels, and carriage-controlled means for selectively determining the totalizers in which computation is to be effected in a given zone, and concomitantly rendering ineffective the preventing devices associated with the selected totalizers.

121. In a combined typewriting and computing machine, in combination, a carriage, a totalizer comprising number wheels, a clearance-printing key, a latch for said key yieldably urged to ineffective position, and means for holding said latch in effective position, such that release of the latch may be effected only when said wheels are in cleared or zero position and said carriage is in a selected zone.

122. In a combined typewriting and computing machine, in combination, a carriage, a totalizer comprising number wheels, a clearance-printing key, a latch for said key yieldably urged to ineffective position, means for holding said latch in effective position, and means whereby passage of said carriage out of a computing zone may cause restoration of the latch to effective position.

123. In a combined typewriting and computing machine, in combination, a carriage, a totalizer comprising number wheels, a clearance key, means whereby actuation of said clearance key will effect printing of a clearance sign, a lock for said clearance key, controlled by said number wheels, means for driving said wheels in accordance with the number typed, a shutter for said number wheels, means yieldably urging said clearance-key lock and said shutter away from their effective positions, means controlled by said number wheels to prevent said lock from being made ineffective, and carriage-controlled means normally preventing said lock from being made ineffective and preventing release of said shutter, but ineffective for such purposes when the carriage is in a computing zone.

124. In a combined typewriting and computing machine, in combination, a carriage, a totalizer comprising a set of number wheels, a shutter therefor yieldably urged to ineffective position, denominational elements settable in accordance with digits typed, a general operator to actuate the denominational elements, a member to maintain said shutter in effective position, movable to ineffective position by said carriage upon entering a computing zone, and a locking device for said shutter settable by said carriage to be rendered ineffective by the actuation of said general operator.

125. In a combined typewriting and computing machine, in combination, a plurality of totalizers, each of which comprises a set of computing wheels, a set of denominational devices on which digits may be indexed either additively or subtractively when printed, a general operator for actuating said denominational devices in accordance with the digits indexed, and means, individual to said sets of computing wheels, normally ineffective for actuating the same from said denominational devices, but rendered effective therefor by said general operator when the carriage is passing through computing zones therefor.

126. In a combined typewriting and computing machine, in combination, a plurality of totalizers, each comprising denominational pinions, denominational master drivers, each having a pinion for driving the corresponding denominational pinion of each totalizer, a set of bars for each totalizer, each bar having a rack to co-operate with a pinion in the totalizer and a pinion of a master driver, said bars being normally out of mesh with said pinions, means to actuate said master drivers for addition or complementary subtraction, and means whereby, upon operation of said actuating means, selected sets of said bars will be moved into mesh with the pinions in the corresponding totalizers and the pinions on the master drivers before the movement of said master drivers is started.

127. In a combined typewriting and computing machine, in combination, a carriage, a plurality of totalizers, each comprising a set of computing pinions, toothed members normally out of mesh with said pinions, but adapted to be moved into mesh therewith, actuating means for said members settable either for addition or subtraction, and carriage-controlled means whereby, upon actuation of the carriage in a computing zone, the toothed members associated with selected totalizers will be placed under the control of said actuating means and the latter set either for addition or for subtraction, so that operation of the latter will shift said toothed members into mesh with the corresponding pinions and then drive said toothed members to actuate the pinions.

128. In a combined typewriting and computing machine, in combination, a carriage, a plurality of totalizers, a series of master drivers, one for each denomination, means to actuate said master drivers to effect addition or complementary subtraction, and means whereby the entrance of the carriage into a computing zone will determine the totalizers to be actuated by said master drivers and also the setting of said actuating means for addition or subtraction.

129. In a combined typewriting and computing machine, in combination, a plurality of totalizers, a set of master drivers, comprising pinions, a set of racks for each totalizer to enable actuation thereof by the master drivers, said racks being normally out of mesh with said pinions, actuating means for said master drivers, and means whereby, upon operation of said actuating means, the racks of predetermined sets will be moved into mesh with the corresponding pinions on the master drivers and the racks will then be actuated to effect computation in the totalizers.

130. In a combined typewriting and computing machine, in combination, a plurality of totalizers, a set of master drivers, comprising pinions, one master driver for each denomination, means for actuating said master drivers, including a general operator, a set of racks for each totalizer to enable actuation thereof by the master drivers, said racks being normally out of mesh with said pinions, means whereby actuation of the general operator will effect a meshing relation between the racks of the selected totalizers and said master drivers to enable numbers to be computed, and whereby, upon the initiation of the return movement of said general operator, the racks will be withdrawn from the pinions, and means whereby the general operator in its return movement will restore the racks to their normal positions.

131. In a computing machine, in combination, a totalizer comprising computing elements and carry-over mechanism, a set of settable controlling elements, one for each of said computing elements, means including a set of transfer elements for connecting said controlling elements with said computing elements, a movable support for said transfer elements normally holding the same in ineffective position, a general operator for actuating the controlling elements, in accordance with the settings thereon, and then the carry-over mechanism, general-operator-actuated means for shifting said support to render the transfer elements effective during the effective actuation of the controlling elements, and then releasing the support, and means to lock said support in its normal position during the actuation of the carry-over mechanism.

132. In a computing machine, in combination, a totalizer comprising computing elements and carry-over mechanism, a set of settable controlling elements, one for each of said computing elements, means including a set of transfer elements for connecting said controlling elements with said computing elements, a movable support for said transfer elements normally holding the same in ineffective position, a general operator for actuating the controlling elements, in accordance with the settings thereon, and then the carry-over mechanism, general-operator-actuated means for shifting said support to render the transfer elements effective during the effective actuation of the controlling elements, and then releasing the support, and means to insure the return of the support to normal position and to lock it in such position during the actuation of the carry-over mechanism.

133. In a computing machine, in combination, a totalizer comprising computing elements, a set of settable controlling elements, one for each of said computing elements, means including a set of transfer elements for connecting said controlling elements with said computing elements, a movable support for said transfer elements normally holding the same in ineffective position, a general operator movable in one direction to actuate the controlling elements, in accordance with the settings thereon, and in the other direction to its normal position, means to shift the support to render the transfer elements effective during the actuation of the controlling elements, and then to release the same, and means to lock said support in its normal position during the return movement of the general operator.

134. In a computing machine, in combination, a totalizer comprising computing elements, a set of settable controlling elements, one for each of said computing elements, means including a set of transfer elements for connecting said controlling elements with said computing elements, a movable support for said transfer elements normally holding the same in ineffective position, a general operator movable in one direction to actuate the controlling elements, in accordance with the settings thereon, and in the other direction to its normal position, means to shift the support to render the transfer elements effective during the actuation of the controlling elements, and then to release the same, and means to insure the return of said support to its normal position and to lock it in such position during the return movement of the general operator.

135. In a computing machine, in combination, a totalizer comprising computing elements and carry-over mechanism, a set of settable controlling elements, one for each of said computing elements, means for connecting said controlling elements with said computing elements including transfer elements normally in ineffective position, a general operator for actuating said controlling elements, in accordance with the settings thereon, and then actuating said carry-over mechanism, general-operator-actuated means for shifting said transfer elements to render them effective during the actuation of the controlling elements, and then releasing the same, and means to lock said shifting means in ineffective condition during the actuation of the carry-over mechanism.

136. In a computing machine, in combination, a totalizer comprising computing elements and carry-over mechanism, a set of settable controlling elements, one for each of said computing elements, means for connecting said controlling elements with said computing elements including transfer elements normally in ineffective position, a general operator for actuating said controlling elements, in accordance with the settings thereon, and then actuating said carry-over mechanism, general-operator-actuated means for shifting said transfer elements to render them effective during the actuation of the controlling elements, and then releasing the same, and means to insure the return of said shifting means to normal position and to lock it in such position during the actuation of the carry-over mechanism.

137. In a computing machine, in combination, a totalizer comprising computing elements, computing-element-actuating means including a set of settable controlling elements, one for each of said computing elements, a general operator for actuating said controlling elements, in accordance with their respective settings, carry-over mechanism including elements settable by said computing elements during the actuation of the general operator, and a universal device to actuate said carry-over elements after the same have been set, and means whereby said universal device will be locked in position during the actuation of said controlling elements by the general operator.

138. In a computing machine, in combination, a totalizer comprising computing elements, computing-element-actuating means including a set of settable controlling elements, one for each of said computing elements, carry-over mechanism including elements settable by said computing elements, and a universal device for actuating the carry-over elements set by said computing elements, a general operator for actuating said controlling elements during its forward movement, means whereby said universal device may be locked during the forward movement of the general operator, and means whereby said universal device will be actuated during the return movement of the general operator.

HANS HANSON.

Witnesses:
CATHERINE A. NEWELL,
EDITH B. LIBBEY.